United States Patent
Bae et al.

(10) Patent No.: US 11,301,042 B2
(45) Date of Patent: Apr. 12, 2022

(54) HAND-WEARABLE DEVICE AND MANUFACTURING METHOD THEREFOR

(71) Applicants: FEEL THE SAME, INC., Ulsan (KR); UNIST (ULSAN NATIONAL INSTITUTE OF SCIENCE AND TECHNOLOGY), Ulsan (KR)

(72) Inventors: Joon Bum Bae, Ulsan (KR); Su In Kim, Ulsan (KR); Woo Keun Park, Goyang-si (KR); Da Hee Jeong, Ulsan (KR); Jin Hyeok Oh, Ulsan (KR)

(73) Assignees: FEEL THE SAME, INC., Ulsan (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 17/134,006

(22) Filed: Dec. 24, 2020

(65) Prior Publication Data

US 2021/0116999 A1    Apr. 22, 2021

Related U.S. Application Data

(63) Continuation of application No. 16/494,575, filed as application No. PCT/KR2018/015408 on Dec. 6, 2018, now Pat. No. 10,908,685.

(30) Foreign Application Priority Data

Feb. 20, 2018 (KR) .................. 10-2018-0020020
Mar. 9, 2018 (KR) .................. 10-2018-0028295
(Continued)

(51) Int. Cl.
*G06F 3/01* (2006.01)
*G06F 3/16* (2006.01)
(Continued)

(52) U.S. Cl.
CPC ................. *G06F 3/014* (2013.01); *G06F 1/16* (2013.01); *G01L 1/20* (2013.01); *G01L 1/22* (2013.01)

(58) Field of Classification Search
CPC . G06F 3/014; G06F 1/16; H01L 24/05; H01L 24/24; H01L 24/29; H01L 24/32;
(Continued)

(56) References Cited

U.S. PATENT DOCUMENTS

2006/0097373 A1    5/2006   Ito
2015/0331533 A1*  11/2015  McMillen ........... G06F 3/04166
                                                           345/174
(Continued)

FOREIGN PATENT DOCUMENTS

JP    07-094965 B2    10/1995
JP    2016-080675 A    5/2016
(Continued)

OTHER PUBLICATIONS

Xuelin Wan et al. "Recent Advancements in Liquid Metal FlexiblePrinted Electronics: Properties, Technologies, and Applications", Nov. 30, 2016, Tsinghua University, Beijing China.
(Continued)

*Primary Examiner* — Xuemei Zheng
(74) *Attorney, Agent, or Firm* — Novick, Kim & Lee, PLLC; Jae Youn Kim

(57) ABSTRACT

A hand-wearable device includes an elastic sheet including a first elastic layer and a second elastic layer facing each other; a sensor unit formed by printing a predetermined conductive liquid metal between the first elastic layer and the second elastic layer; a wire unit extending from the sensor unit and electrically connected to the sensor unit; an electrode substrate formed on one side of the wire unit and spaced apart from the wire unit by a predetermined distance;
(Continued)

and a connection electrode formed by printing a predetermined conductive liquid metal between the wire unit and the electrode substrate.

16 Claims, 20 Drawing Sheets

(30) Foreign Application Priority Data

| | | | |
|---|---|---|---|
| Mar. 19, 2018 | (KR) | ................ | 10-2018-0031696 |
| Apr. 12, 2018 | (KR) | ................ | 10-2018-0042915 |

(51) Int. Cl.
  *G06F 1/16* (2006.01)
  *G01L 1/20* (2006.01)
  *G01L 1/22* (2006.01)

(58) Field of Classification Search
  CPC ......... H01L 24/76; H01L 24/82; H01L 24/83; H01L 2224/24998; H01L 2224/73203; H01L 2224/76155; H01L 2224/82102; H01L 2224/838; H01L 2224/92244; H01B 13/008; G01L 1/20; G01L 1/22
  See application file for complete search history.

(56) References Cited

U.S. PATENT DOCUMENTS

2016/0070347 A1* 3/2016 McMillen ............... G06F 3/014
                                                    345/173
2016/0290880 A1   10/2016 Lewis et al.

FOREIGN PATENT DOCUMENTS

| | | |
|---|---|---|
| JP | 2017-041375 A | 2/2017 |
| JP | 2017-538187 A | 12/2017 |
| KR | 10-2006-0025796 A | 3/2006 |
| KR | 10-2015-0000147 A | 1/2015 |
| KR | 10-2015-0044084 A | 4/2015 |
| KR | 10-1543628 B1 | 8/2015 |
| KR | 10-2017-0006817 A | 1/2017 |
| WO | 2016-070078 A1 | 5/2016 |

OTHER PUBLICATIONS

Zheng et al., "Pervasive liquid metal based direct writing electronics with roller-ball pen", AIP Adv. 2013, 3, 6459-6463.

* cited by examiner

HAND-WEARABLE DEVICE AND MANUFACTURING METHOD THEREFOR

CROSS-REFERENCES TO RELATED APPLICATIONS

This application is a continuation of U.S. application Ser. No. 16/494,575, filed Sep. 16, 2019, which is a 371 of international application of PCT/KR2018/015408, filed Dec. 6, 2018, which claims priority to and benefit of KR 10-2018-0020020, filed Feb. 20, 2018, KR 10-2018-0028295, filed Mar. 9, 2018, KR 10-2018-0031696, filed Mar. 9, 2018, and KR 10-2018-0042915, filed on Apr. 12, 2018 of which disclosures are incorporated herein by reference by their entireties.

TECHNICAL FIELD

One or more embodiments relate to a hand-wearable device and a method of manufacturing the same.

BACKGROUND ART

Recently, attention has been drawn to hand-wearable devices which are worn on the hands for interacting with a virtual object by transmitting a force generated from the virtual object in virtual reality to fingers.

Accordingly, the analysis of hand movements should precede and studies should be conducted to measure hand movements more easily while a hand-wearable device is worn.

A soft sensor may include an electrode made of a conductive material having elasticity and flexibility, and may be a sensor having elasticity and flexibility and capable of measuring displacement or force. Recently, as fields of application of wearable devices, etc. expand, the demand for soft sensors having elasticity and flexibility is increasing.

DESCRIPTION OF EMBODIMENTS

Technical Problem

The present disclosure provides a hand-wearable device which is easy to be manufactured and has improved performance, and a method of manufacturing the hand-wearable device.

Solution to Problem

One and more embodiments include a hand-wearable device including an elastic sheet including a first elastic layer and a second elastic layer facing each other; a sensor unit formed by printing a predetermined conductive liquid metal between the first elastic layer and the second elastic layer; a wire unit extending from the sensor unit and electrically connected to the sensor unit; an electrode substrate formed on one side of the wire unit and spaced apart from the wire unit by a predetermined distance; and a connection electrode formed by printing a predetermined conductive liquid metal between the wire unit and the electrode substrate.

Herein, the connection electrode may be electrically connected to the wire unit and the electrode substrate.

Herein, the connection electrode may cover each of one end of the wire unit and one end of the electrode substrate.

Herein, the conductive liquid metal may include an eutectic gallium-indium (EGaIn) alloy.

Herein, the predetermined conductive liquid metal forming the sensor unit and the predetermined conductive liquid metal forming the connection electrode may be the same as each other.

Herein, at least a portion of the electrode substrate may be exposed to the outside of the elastic sheet.

Herein, a plurality of sensor units may be formed, and each of the plurality of sensor units and the elastic sheet in contact with the plurality of sensor units may be combined to form a soft sensor.

Herein, the hand-wearable device is formed in a shape corresponding to at least a portion of a user's hand shape, and the at least one soft sensor is located at a position corresponding to at least some joints of the hand.

Herein, the soft sensor may be formed on a joint portion of a finger and may be a sensor measuring the bending and stretching of the corresponding finger, or may be formed between adjacent fingers and may be an adduction/abduction measuring sensor measuring the adduction and abduction of at least some of the two fingers.

According to one or more embodiments, a method of manufacturing a hand-wearable device includes forming a first elastic layer on a base substrate; forming a sensor unit and a wire unit by printing a predetermined conductive liquid metal on the first elastic layer in a predetermined pattern; arranging an electrode substrate on one side of the wire unit to be spaced apart from the wire unit by a predetermined degree; forming a connection electrode connecting the electrode substrate to the wire unit by printing a predetermined conductive liquid metal on the first elastic layer; and forming a second elastic layer on the first elastic layer; wherein the forming of the connection electrode includes printing the conductive liquid metal from one end of the wire unit while a nozzle is moved in a first direction to a certain extent; making the conductive liquid metal erect in a second direction while a nozzle is moved in the second direction to a certain extent; moving the nozzle toward the electrode substrate such that the conductive liquid metal electrically contacts one end of the electrode substrate while the conductive liquid metal connected to the nozzle falls down onto the electrode substrate; and separating the conductive liquid metal from the nozzle.

Herein, the connection electrode may cover each of one end of the wire unit and one end of the electrode substrate.

Herein, the conductive liquid metal may include an eutectic gallium-indium (EGaIn) alloy.

Herein, the forming of the connection electrode may include printing performed by a nozzle which is movable in directions of three axes.

Herein, the predetermined conductive liquid metal forming the sensor unit and the predetermined conductive liquid metal forming the connection electrode may be the same as each other.

Herein, the conductive liquid metal, which has been made erect in the second direction, may fall down toward the electrode substrate to which the nozzle moves, the conductive liquid metal may be in electrical contact with one end of the electrode substrate.

Herein, the making erecting the conductive liquid metal in the second direction while the nozzle is moved in the second direction to a certain extent may make the conductive liquid metal erect vertically to a height sufficient to cover one end of the electrode substrate when the conductive liquid metal falls down.

Herein, the arranging of the electrode substrate on one side of the wire unit may arrange the electrode substrate such that at least a portion of the electrode substrate is exposed to the outside of the first elastic layer.

Herein, the method may further include, after forming the second elastic layer on the first elastic layer, cutting, into a shape suitable for a worn portion, remaining portions of the first elastic layer and the second elastic layer except for portions in which the sensor unit is formed.

Herein, a plurality of the sensor units may be provided, and each of the plurality of sensor may be combined with the elastic sheet in contact with the sensor unit to form a soft sensor.

Herein, the hand-wearable device is formed in a shape corresponding to at least a portion of a user's hand shape, and the at least one soft sensor is located at a position corresponding to at least some joints of the hand.

One or more embodiments include a hand-wearable device including an elastic sheet including a first elastic layer and a second elastic layer, a sensor unit formed by printing a predetermined conductive liquid metal between the first elastic layer and the second elastic layer; a wire unit extending from the sensor unit and electrically connected to the sensor unit; an electrode substrate formed on one side of the wire unit and apart from the wire unit with a predetermined distance; a junction unit formed between the wire unit and the electrode substrate to electrically connect the wire unit and the electrode substrate; and an extending portion extending from one surface of the elastic sheet, wherein at least a portion of the junction unit and the electrode substrate are formed in the extending portion.

Herein, the extending portion may be formed by cutting an edge of an area in which the junction unit and the electrode substrate are formed in the elastic sheet.

Herein, the hand-wearable device may further include a filling portion formed by lifting up the cut portion and coating an elastic material on the cut portion.

Herein, the extending portion including the electrode substrate and the junction unit may be formed by branching from the elastic sheet.

Herein, an end of the electrode substrate may be formed to be exposed to the outside of the elastic sheet such that the electrode substrate may be electrically connected to an external connector.

Herein, a sealing portion preventing the leakage of the junction unit may be further formed at a boundary portion between a region exposed the electrode substrate to the outside and the elastic sheet.

Herein, a protective portion surrounding a remaining portion of the extending portion except for the region exposed the electrode substrate to the outside may be further formed.

Herein, a reinforcement portion supporting the extending portion may be further formed at least one side of the extending portion.

Herein, the junction unit may be formed by printing a predetermined conductive liquid metal between the wire unit and the electrode substrate.

Herein, the junction unit may cover each of one end of the wire unit and one end of the electrode substrate.

In addition, one or more embodiments include a method of manufacturing a hand-wearable device, the method including forming a first elastic layer on a base substrate; forming a sensor unit and a wire unit by printing a predetermined conductive liquid metal on the first elastic layer in a predetermined pattern; arranging an electrode substrate on one side of the wire unit to be spaced apart from the wire unit by a predetermined degree; forming a junction unit connecting the electrode substrate to the wire unit by printing a predetermined conductive liquid metal on the first elastic layer; forming a second elastic layer on the first elastic layer; forming an extending portion extending from one surface of the second elastic layer and including at least a portion of the junction unit and the electrode substrate, wherein the forming of the extending portion includes cutting a portion of the second elastic layer along an edge of the electrode substrate and a portion where the junction unit is formed, and forming a filling portion by lifting up the cut portion and coating an elastic material in the cut portion.

Herein, the method may further include, after forming the filling portion, separating the elastic sheet formed on one end of the electrode substrate and exposing the end of the electrode substrate to the outside; forming a sealing portion preventing leakage of the junction unit at the boundary portion between a region in which the electrode substrate is exposed to the outside and the elastic sheet; forming a reinforcement portion supporting the extending portion at at least one side of the extending portion; and forming a protective portion surrounding a remaining portion of the extending portion except for an area exposing the electrode substrate to the outside.

Herein, the method may further include, after forming the protective portion, coupling the extending portion to a main body of the elastic sheet.

Herein, the extending portion including the electrode substrate and the junction unit may be formed by branching from the elastic sheet.

Herein, the forming of the junction unit may include printing the conductive liquid metal from one end of the wire unit while the nozzle is moved in a first direction to certain extent; making the conductive liquid metal erect in a second direction while the nozzle is moved in the second direction to certain extent; moving the nozzle toward the electrode substrate such that the conductive liquid metal electrically contacts one end of the electrode substrate while the conductive liquid metal connected to the nozzle is seated on the electrode substrate; and removing the conductive liquid metal from the nozzle.

Herein, the junction unit may cover each of the one end of the wire unit and the one end of the electrode substrate.

Herein, the forming of the junction unit may include printing performed by a nozzle which is movable in directions of three axes.

Herein, the conductive liquid metal, which has been made erect in the second direction, may fall down toward the electrode substrate to which the nozzle moves and the conductive liquid metal may be in electrical contact with one end of the electrode substrate.

Herein, the making erect of the conductive liquid metal in the second direction while the nozzle is moved in the second direction to a certain extent may make the conductive liquid metal erect vertically to a height sufficient to cover one end of the electrode substrate when the conductive liquid metal falls down.

One or more embodiments include a hand-wearable device including an elastic sheet including a first elastic layer and a second elastic layer, a sensor unit formed by printing a predetermined conductive liquid metal between the first elastic layer and the second elastic layer; a wire unit extending from the sensor unit and electrically connected to the sensor unit; an electrode substrate formed on one side of the wire unit and apart from the wire unit with a predetermined distance; a junction unit formed between the wire unit and the electrode substrate to electrically connect the wire unit and the electrode substrate; a contact connector formed on one side of the electrode substrate to contact at least a portion of the electrode substrate; and a flexible printed circuit (FPC) connector formed on one side of the contact connector to be electrically connected to the contact connector and electrically connected to an external device.

Herein, the contact connector may be formed to have a predetermined elasticity and the contact connector may be in close contact with the electrode substrate.

Herein, the contact connector may have a plurality of terminals and a determined elastic member may be provided inside each of the plurality of terminals of the contact connector, and the elastic member may apply an elastic force in a direction pushing each terminal of the contact connector to the electrode substrate.

Herein, a first opening may be formed in the second elastic layer in at least a region in which the electrode substrate is formed and the electrode substrate may be in contact with the contact connector through the first opening.

Herein, a sealing portion preventing the leakage of the junction unit may be further formed at a boundary portion between the first opening and the electrode substrate.

Herein, the hand-wearable device may further include a first plate formed on one surface of the elastic sheet, a second plated formed on the other surface of the elastic sheet and provided with the contact connector and the FPC connector, and a coupling member coupling the first plate to the second plate, wherein the first plate and the second plate are coupled by the coupling member and form a connection unit extending from one surface of the elastic sheet.

Herein, at least a portion of the junction unit and the electrode substrate may be formed in the connection unit.

Herein, the connection unit including the electrode substrate and the junction unit may be formed by branching from the elastic sheet.

Herein, a reinforcement portion supporting the elastic sheet and the electrode substrate may be further formed on at least one outer surface of the region in which the electrode substrate is embedded in the elastic sheet.

According to one or more embodiments, a method of manufacturing a hand-wearable device includes, forming a first elastic layer on a base substrate; forming a sensor unit and a wire unit by printing a predetermined conductive liquid metal on the first elastic layer in a predetermined pattern; arranging an electrode substrate on one side of the wire unit to be spaced apart from the wire unit by a predetermined degree; forming a junction unit connecting the electrode substrate to the wire unit by printing a predetermined conductive liquid metal on the first elastic layer; forming a second elastic layer on the first elastic layer; removing a portion of the second elastic layer and forming a first opening to expose at least a portion of the electrode substrate; arranging a first plate on one surface of the first elastic layer; arranging a second plate, including a contact connector in contact with at least a portion of the electrode substrate through the first opening and an FPC connector electrically connected to the contact connector, on one surface of the second elastic layer; and coupling the first plate to the second plate by using a coupling member.

Herein, the method may further include, after forming the first opening, forming a second opening in a region adjacent to a region where the electrode substrate is formed in the first elastic layer and the second elastic layer; wherein in the coupling of the first plate to the second plate by using the coupling member, the coupling member is inserted through the first plate, the second opening, and the second plate to couple the first plate and the second plate.

Herein, the method may further include, after forming the first opening, forming a sealing portion at a boundary region between the first opening and the electrode substrate to prevent the leakage of the junction unit.

Herein, the method may further include, after forming the first opening, forming a reinforcement portion on at least one outer surface of a region in which the electrode substrate is embedded in the first elastic layer or second elastic layer to support the first elastic layer or the second elastic layer.

Herein, the contact connector may be formed to have a predetermined elasticity and the contact connector may be in close contact with the electrode substrate.

Herein, the contact connector may have a plurality of terminals and a determined elastic member may be provided inside each of the plurality of terminals of the contact connector, and the elastic member may apply an elastic force in a direction pushing each terminal of the contact connector to the electrode substrate.

Herein, the connection unit including the electrode substrate and the junction unit may be formed by branching from the second elastic layer.

Herein, the forming of the junction unit may include printing the conductive liquid metal from one end of the wire unit while the nozzle is moved in a first direction to certain extent; making the conductive liquid metal erect in a second direction while the nozzle is moved in a second direction including a predetermined angle with the first direction to certain extent; moving the nozzle toward the electrode substrate such that the conductive liquid metal electrically contacts one end of the electrode substrate while the conductive liquid metal connected to the nozzle is seated on the electrode substrate; and separating the conductive liquid metal from the nozzle.

Herein, the conductive liquid metal, which has been made erect in the second direction, may be fall down toward the electrode substrate to which the nozzle moves and the conductive liquid metal may be in electrical contact with one end of the electrode substrate.

Herein, the making erect the conductive liquid metal in the second direction while the nozzle is moved in the second direction to a certain extent may make the conductive liquid metal erect vertically to a height sufficient to cover one end of the electrode substrate when the conductive liquid metal falls down.

Herein, the junction unit may cover each of one end of the wire unit and one end of the electrode substrate.

One or more embodiments include a printed cable including an elastic sheet including a first elastic layer and a second elastic layer; at least one wire unit formed by printing a predetermined conductive liquid metal between the first elastic layer and the second elastic layer; an electrode substrate formed on at least one side of the wire unit and apart from the wire unit by a certain extent; and a junction unit formed by printing a predetermined conductive liquid metal between the wire unit and the electrode substrate.

Herein, the junction unit may be electrically connected to the wire unit and the electrode substrate.

Herein, the junction unit may cover each of the one end of the wire unit and the one end of the electrode substrate.

Herein, the conductive liquid metal may include an EGaIn.

Herein, the predetermined conductive liquid metal forming the wire unit and the predetermined conductive liquid metal forming the junction unit may be the same as each other.

Herein, at least a portion of the electrode substrate may be exposed to the outside of the elastic sheet.

One or more embodiments include a method of manufacturing a printed cable, the method including forming a first elastic layer on a base substrate; forming a wire unit by printing a predetermined conductive liquid metal on the first elastic layer; arranging an electrode substrate on at least one side of the wire unit to be apart from the wire unit by a certain extent; forming a junction unit connecting the electrode substrate to the wire unit by printing a predetermined conductive liquid metal on the first elastic layer; and forming a second elastic layer on the first elastic layer; wherein the forming of the junction unit includes printing the conductive liquid metal from one end of the wire unit while the nozzle is moved in a first direction to a certain extent; making the conductive liquid metal erect in a second direction while the nozzle is moved in the second direction to a certain extent; moving the nozzle toward the electrode substrate such that the conductive liquid metal electrically contacts one end of the electrode substrate while the conductive liquid metal connected to the nozzle is seated on the electrode substrate; and separating the conductive liquid metal from the nozzle.

Herein, the junction unit may cover each of the one end of the wire unit and the one end of the electrode substrate.

Herein, the conductive liquid metal may include an EGaIn.

Herein, the forming of the junction unit may include performing printing by a nozzle which is movable in directions of three axes.

Herein, the predetermined conductive liquid metal forming the wire unit and the predetermined conductive liquid metal forming the junction unit may be the same as each other.

Herein, the conductive liquid metal, which has been made erect in the second direction, may fall down toward the electrode substrate to which the nozzle moves and the conductive liquid metal may be in electrical contact with one end of the electrode substrate.

Herein, the making erect of the conductive liquid metal in the second direction while the nozzle is moved in the second direction to a certain extent may make the conductive liquid metal erect vertically to a height sufficient to cover one end of the electrode substrate when the conductive liquid metal falls down.

Herein, the arranging of the electrode substrate on the one side of the wire unit may arrange the electrode substrate such that at least a portion of the electrode substrate is exposed to the outside of the first elastic layer.

Advantageous Effects of Disclosure

According to the hand-wearable device and the method of manufacturing the same of the present disclosure, the hand-wearable device may be easily manufactured and the performance of the hand-wearable device may be improved.

BEST MODE

Figure 1:
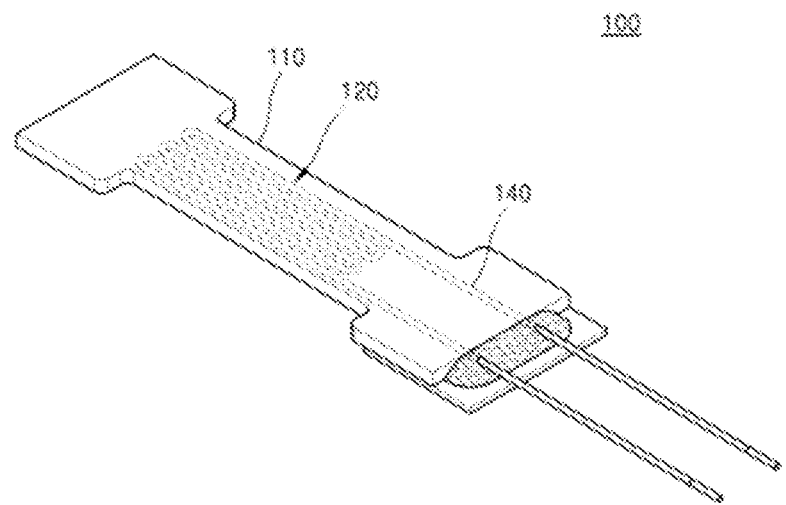
FIG. 1 is a perspective view of a soft sensor according to an embodiment.

As the present disclosure allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept. In the description, certain detailed explanations of the related art are omitted when it is deemed that they may unnecessarily obscure the essence of the inventive concept.

While such terms as "first," "second," etc., may be used to describe various elements, such elements must not be limited to the above terms. The above terms are used only to distinguish one element from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, the inventive concept will be described more fully with reference to the accompanying drawings, in which exemplary embodiments of the inventive concept are shown. This inventive concept may, however, be embodied in many different forms and should not be construed as being limited to the exemplary embodiments set forth herein.

In addition, in describing various embodiments of the inventive concept, each embodiment should not be interpreted or implemented independently. It should be understood that the inventive concepts described in each embodiment can be interpreted or implemented in combination with other embodiments separately described.

Hereinafter, embodiments of the present disclosure will now be described with reference to the accompanying drawings.

FIG. 1 is a perspective view of a soft sensor according to an embodiment.

Referring to FIG. 1, a soft sensor 100 according to an embodiment may include an elastic sheet 110, a sensor unit 120, and a wire unit 140.

Herein, the soft sensor of an embodiment may be used to measure an angle of a joint in a field of virtual reality, coexistence reality or rehabilitation. In particular, the soft sensor of an embodiment may be used as a unit configured to measure an angle of a finger joint to input data to a virtual reality device or the like.

In detail, the elastic sheet 110 includes a first elastic layer 111 and a second elastic layer 112. The first elastic layer 111 and the second elastic layer 112 may be formed separately and have a stacked structure in a vertical direction. Herein, although the elastic sheet 110 is shown as including two layers of the first elastic layer 111 and the second elastic layer 112, the inventive concept is not limited thereto. The elastic sheet 110 may include two or more layers of various materials when needed. The elastic sheet 110 will be described in more detail below.

The first elastic layer 111 is a layer formed by coating with a first elastic material. The first elastic material may be a non-conductive material having elasticity and flexibility. Herein, although the first elastic material is described as using, for example, silicone, the inventive concept is not limited thereto. As described above, the first elastic layer 111 may be formed by coating the first elastic material on a base substrate (see 101 in FIG. 5A) by various methods such as spin coating, silicone coating (squeegeeing), compression molding, printing, or the like.

The second elastic layer 112 is a layer formed by coating with a second elastic material. The second elastic material may be a non-conductive material having elasticity and flexibility. The second elastic material may use a material having a surface tension less than that of a conductive liquid metal (see 121 of FIG. 5B) forming the sensor unit 120. In an embodiment, for example, as the second elastic material uses silicone, the first elastic material and the second elastic material are described as the same material, but the inventive concept is not limited thereto. Herein, when the first elastic material and the second elastic material use the same silicone, the silicone may be formed as a monolithic sheet. However, the inventive concept is not limited thereto. The second elastic material may use any material as a material has a surface tension less than the conductive liquid metal 121 and has elasticity and flexibility. As described above, the second elastic layer 112 may be formed by coating the second elastic material on the first elastic layer 111 (and the sensor unit 120 on the first elastic layer 111) by various methods such as spin coating, silicone coating (squeegeeing), compression molding, printing, or the like.

The sensor unit 120 may be formed between the first elastic layer 111 and the second elastic layer 112. Herein, the sensor unit 120 may be formed on the first elastic layer 111 in a predetermined pattern by using the conductive liquid metal (see 121 of FIG. 5B). As described above, the sensor unit 120 may be formed by using various methods such as 3D printing, nozzle printing, inkjet printing, roll-to-roll printing, or the like.

The sensor unit 120 may include a predetermined conductive material and may include a conductive material in a liquid or solid form which is capable to be coated. In an embodiment, the sensor unit 120 may include a conductive liquid metal that maintains a liquid state at room temperature and has conductivity. Herein, the conductive liquid metal is described as using eutectic gallium-indium (EGaIn) as an example.

The EGaIn is also referred to as an eutectic gallium-indium composite. The EGaIn may include 75.5 wt % of gallium (Ga) and 24.5 wt % of indium (In). The EGaIn may be dissolved at about 15.7° C. and maintain a liquid state at room temperature. In addition, the EGaIn has a conductivity level of $3.4 \times 10^4$ S/cm, which is very high conductivity. In addition, the EGaIn is low in viscosity and flows well, and has a high surface tension due to an oxide film on the surface thereof. Since the EGaIn has a high surface tension, it is easy to form micro-channels as the EGaIn maintains a shape when 3D printing in a desired pattern. In addition, it is possible to print the EGaIn directly in a desired pattern by injection through a syringe coupled to a CNC facility without any chemical treatment.

As described above, as the sensor unit 120 includes the conductive liquid metal, the sensor unit 120 may have sufficient elasticity.

Positions of the soft sensor may be provided on a joint portion of each finger of a surface of the hand-wearable device and between a thumb and an index finger and the soft sensor provided between the thumb and the index finger may be configured to detect movements of adduction and abduction of the thumb.

In addition, the soft sensor provided in the joint portion of each finger may include both of a sensor measuring bending and stretching movements and a sensor measuring the adduction and abduction movements.

Alternatively, the soft sensor provided in the joint portion of each finger may separately include a sensor measuring the bending and stretching movements and a sensor measuring the adduction and abduction movements. In this case, the sensor measuring the bending and stretching movements may be formed long in a longitudinal direction of the fingers and may function as a sensor measuring bending and stretching of the fingers. The sensor measuring the adduction and abduction movements may be formed perpendicular to the longitudinal direction of the fingers or long in adduction direction and abduction direction of the fingers, and may function as a sensor measuring adduction and abduction of the fingers. Herein, since the sensor measuring the bending and stretching movements and the sensor measuring the adduction and abduction movements vary in length, height, and width in response to movements of the fingers, the movements of the fingers may be measured by measuring a change in resistance. The above description will be described in more detail with references to FIGS. 2 and 3.

The wire unit 140 may be electrically connected to the sensor unit 120 and function to transmit an electrical signal transmitted from the sensor unit 120 to an electrode substrate (see 240 of FIG. 3) to be described below. As described above, the wire unit 140 may be formed by printing a conductive paste on the first elastic layer 111 or the base substrate (see 101 of FIG. 5A) by using a 3D printer or the like.

Hereinafter, an operating principle of the soft sensor according to an embodiment will now be described in more detail.

Figure 2:
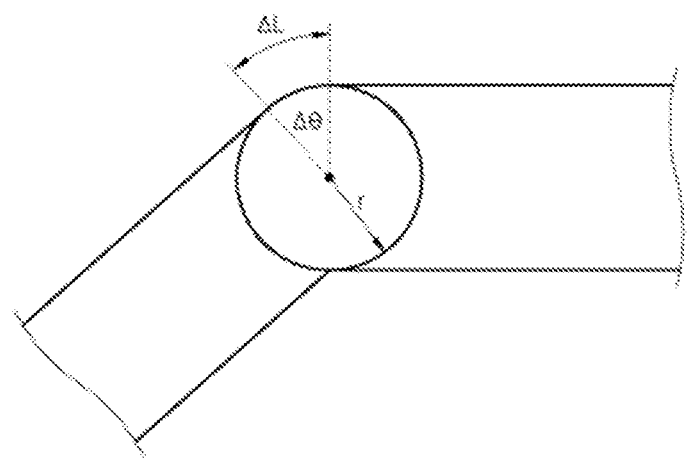
FIG. 2 is a schematic diagram illustrating a change in length of a sensor unit of the soft sensor of FIG. 1 according to a change of a finger joint.

FIG. 2 is a mimetic diagram illustrating a change in length of the sensor unit 120 of the soft sensor according to a change in an angle of a finger joint, according to an embodiment.

Referring to FIG. 2, a principle of the soft sensor of an embodiment is as follows.

Generally, when the resistance of both ends of a micro channel of the soft sensor is referred to as a resistance of conductive metal R, the resistivity of a conductive material in the channel is referred to as an electrical resistivity p ($[\Omega*m]$), the channel volume is referred to as a channel volume V ($[m^2]$), the channel length is referred to as a channel length l ($[m]$), and the strain is referred to as F, and when a highly elastic material inside the micro channel is filled with an incompressible material, a total volume V of the micro channel remains constant and is represented by Equation 1 below.

$$V = A_0 l_0 = Al \quad \text{[Equation 1]}$$

The channel may be viewed as a path through which electrons in a conductive metal pass and, when an appearance of the conductive metal changes, the length, height, width, or the like of the channel may vary and the resistance may also change.

Herein, the channel length is represented by Equation 2 below and a channel cross-sectional area A is represented by Equation 3 below.

$$l = l_0(1+\varepsilon) \quad \text{[Equation 2]}$$

$$A = A_0/(1+\varepsilon) \quad \text{[Equation 3]}$$

The resistance of the conductive metal is represented by Equation 4 below.

$$R = \rho l/A \quad \text{[Equation 4]}$$

A current resistance R may be represented by Equation 5 below by an initial resistance $R_0$ and the strain $\varepsilon$.

$$R = R_0(1+\varepsilon)^2 \quad \text{[Equation 5]}$$

Referring to FIG. 2, an angle change $\Delta\theta$ and a radius r in a finger joint and a change in length of the channel $\Delta L$ are represented by Equation 6 below.

$$\Delta L = r\Delta\theta \quad \text{[Equation 6]}$$

Equation 7 may be obtained when Equation 6 is transposed.

$$\Delta\theta = \Delta L/r \quad \text{[Equation 7]}$$

As r is a constant, the angle change $\Delta\theta$ of the finger joint may be calculated through the change in length of the channel $\Delta L$.

Herein, a properly formed amplifier may be used to measure the resistance change of the soft sensor and the resistance change $\Delta R$ of the soft sensor may be calculated from the voltage change $\Delta V$ measured at an amplifier depending on a nature of the amplifier.

In this case, the strain $\varepsilon$ may be calculated by using the resistance change $\Delta R$ of the soft sensor measured according to Equation 5, and the change in length $\Delta L$ of the channel may be calculated by using the strain $\varepsilon$.

Accordingly, when a sensor with respect to a voltage change $\Delta V$ is provided in the soft sensor of an embodiment, the angle change $\Delta\theta$ of the finger joint may be obtained.

For convenience of explanation, the finger joint is described as an example. However, the soft sensor of the embodiment may be worn in all joints of other portions of the body.

Figure 3:
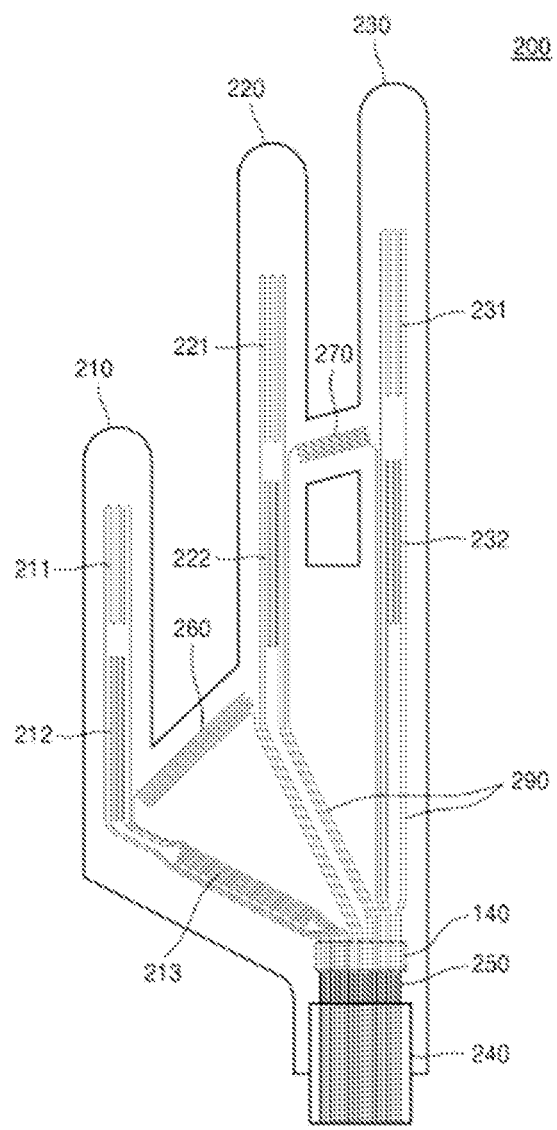
FIG. 3 is a plan view of a hand-wearable device having the soft sensor of FIG. 1.
Figure 4:
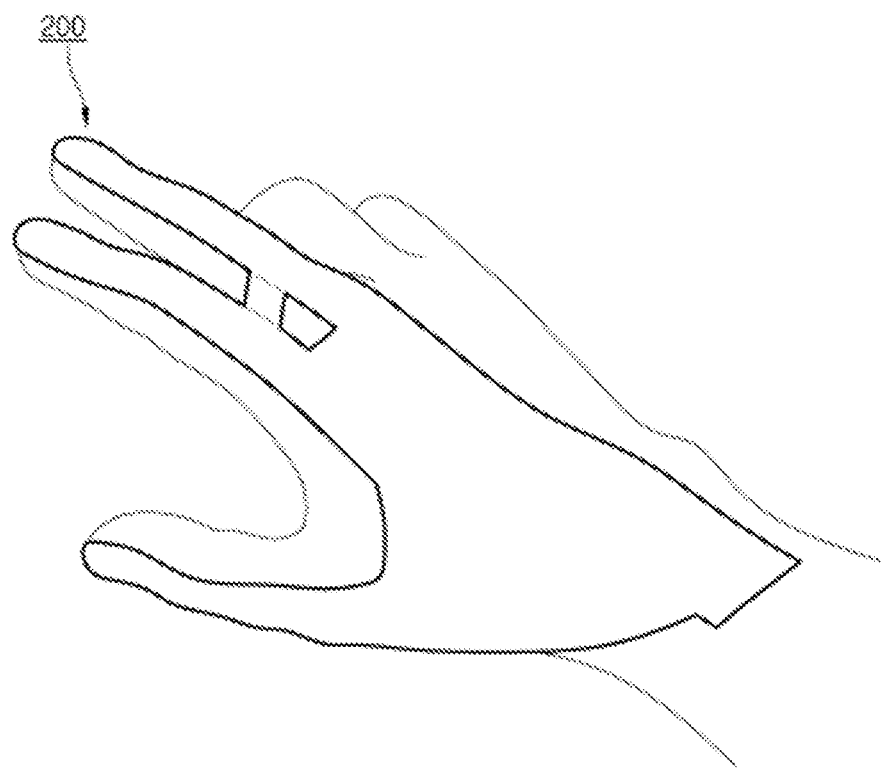
FIG. 4 is a perspective view illustrating a state in which the hand-wearable device of FIG. 3 is worn on a hand.

FIG. 3 is a plan view of a hand-wearable device having the soft sensor of FIG. 1. FIG. 4 is a perspective view illustrating a state in which the hand-wearable device of FIG. 3 is worn on a hand.

Referring to FIGS. 3 and 4, a hand-wearable device 200 may be a sheet of elastic material, in which a plurality of soft sensors 100 are formed to correspond to each joint of a finger. Herein, the hand-wearable device 200 may be formed in a shape corresponding to at least a portion of a hand shape. In an embodiment, the hand-wearable device 200 is described as an example in that the hand-wearable device 200 is formed in a hand shape and a sheet shape to be attached to the back of a hand or a glove, but the inventive concept is not limited thereto. The hand-wearable device 200 may be formed in a form of a glove to which a hand may be fitted. As described above, the hand-wearable device 200 may be formed in a circular or rectangular shape greater than a desired shape, and then may be cut and formed into the desired shape by laser cutting. In other words, a remaining portion except for a portion in which the plurality of sensor units 120 are formed in the elastic sheet 110 may be cut out and used in a shape suitable for a wearing portion such as a finger. The plurality of sensor units 120 may be located at joint portions of each finger to detect a movement of the finger.

The hand-wearable device 200 of FIGS. 3 and 4 will be described in more detail below.

The hand-wearable device 200 includes a thumb sensing unit 210, an index finger sensing unit 220, and a middle finger sensing unit 230. Although not illustrated in the drawing, the hand-wearable device 200 may further include a ring finger sensing unit and a little finger sensing unit.

In addition, the hand-wearable device 200 includes a first adduction/abduction measuring sensor 260 between the thumb sensing unit 210 and the index finger sensing unit 220 and a second adduction/abduction measuring sensor 270 between the index finger sensing unit 220 and the middle finger sensing unit 230. Although not illustrated in the drawing, the hand-wearable device 200 may further include a third adduction/abduction measuring sensor (not shown) formed on a side of the index finger to measure the adduction and abduction of the index finger. Furthermore, although not illustrated in the drawing, the hand-wearable device 200 may further include a fourth adduction/abduction measuring sensor (not shown) between the middle finger sensing unit 230 and the ring finger sensing unit (not shown) and a fifth adduction/abduction measuring sensor (not shown) between the ring finger sensing unit (not shown) and the little finger sensing unit (not shown).

The thumb sensing unit 210 may include a first thumb portion sensor 211, a second thumb portion sensor 212, and a third thumb portion sensor 213. The first thumb portion sensor 211 may measure the bending and stretching between the distal phalanx and proximal phalanx of the thumb. The second thumb portion sensor 212 may measure the bending and stretching between the proximal phalanx and the metacarpals of the thumb. The third thumb portion sensor 213 may measure the bending and stretching between the metacarpals and carpals of the thumb.

The index finger sensing unit 220 may include a first index finger portion sensor 221 and a second index finger portion sensor 222. The first index finger portion sensor 221 may measure the bending and stretching between the middle phalanx and the proximal phalanx of the index finger. The second index finger portion sensor 222 may measure the bending and stretching between the proximal phalanx and the metacarpals of the index finger.

The middle finger sensing unit 230 may include a first middle finger portion sensor 231 and a second middle finger portion sensor 232. The first middle finger portion sensor 231 may measure the bending and stretching between the middle phalanx and the proximal phalanx of the index finger. The second middle finger portion sensor 232 may measure the bending and stretching between the proximal phalanx and the metacarpals of the index finger.

The ring finger sensing unit (not shown) may include a first ring finger portion sensor and a second ring finger portion sensor and the little finger sensing unit (not shown) may include a first little finger portion sensor and a second little finger portion sensor.

The first adduction/abduction measuring sensor 260 may be between the thumb sensing unit 210 and the index finger sensing unit 220 and measure the adduction and abduction of the thumb.

The second adduction/abduction measuring sensor 270 may be between the index finger sensing unit 220 and the middle finger sensing unit 230 and measure the adduction and abduction of the index finger.

In addition, a third adduction/abduction measuring sensor (not shown) and a fourth adduction/abduction measuring sensor (not shown) may also be further formed.

Herein, each of the first thumb portion sensor 211, the second thumb portion sensor 212, the third thumb portion sensor 213, the first index finger portion sensor 221, the second index finger portion sensor 222, the first middle finger portion sensor 231, the second middle finger portion sensor 232, the first adduction/abduction measuring sensor 260, and the second adduction/abduction measuring sensor 270 may be the sensor unit 120 of the soft sensor 100 of FIG. 1. In addition, each wire unit 290 extending from each of the sensors 211, 212, 213, 221, 222, 231, 232, 260, and 270 may be the wire unit 140 of the soft sensor 100 of FIG. 1.

Herein, according to the hand-wearable device 200 according to an embodiment of the present disclosure, a plurality of channel patterns corresponding to each joint of fingers having different lengths and shapes may be integrally designed in one hand-wearable device by a computer-aided design (CAD). In other words, in an embodiment, since the channel patterns are designed by using the CAD, it is easy to design the plurality of channel patterns at once.

As described above, since the plurality of sensor units 120 may be formed at once by using 3D printing or the like, it is easy to manufacture a sensor having a large area size. In addition, since a mold forming the plurality of channel patterns is not needed, manufacturing may be simplified and cost may be reduced.

Although the drawing shows a hand-wearable device worn on three fingers of thumb, index finger, and middle finger and soft sensors arranged on the hand-wearable device, the inventive concept is not limited thereto. In other words, the soft sensors corresponding to all five fingers or some of the fingers, may be arranged on the hand-wearable device, or some soft sensors may be added or omitted in each finger.

Since the soft sensor according to an embodiment is not limited in size, and has a very low thickness and elasticity, the sensor unit 120 may be formed in various numbers and shapes and applying to joins such as shoulders, ankles, wrists, fingers or the like having various sizes and complicated movements is easy.

Although not illustrated in the drawing, the hand-wearable device 200 may further include a chip. The chip may be inserted in a position corresponding to the wrist in the elastic sheet 110. The chip may be inserted by an insert-printing method. The chip may include a flexible printed circuit board (FPCB), a motor driver, a micro control unit, a wireless communication unit, or the like.

Although not illustrated in the drawing, the hand-wearable device 200 may further include a finger wearing portion and a wrist wearing portion. The finger wearing portion and the wrist wearing portion may be separately manufactured from the elastic sheet 110 and then attached to the elastic sheet 110 or may be formed as a single body with the elastic sheet 110.

Herein, the hand-wearable device 200 further includes the electrode substrate 240 and a connection electrode 250.

In a case of a hand-wearable device in the related art, the hand-wearable device is manufactured by cutting a portion of a surface of a soft sensor to reveal a cross-section of a channel and then directly inserting wire and a fixing method by a glue or a non-elastic film is used to prevent the inserted wire from coming off. However, when such a method is used, there is a problem of greater difficulty of electrode insertion as a thickness of the soft sensor decreases and a material of the sensor becomes softer. Furthermore, there is a problem in that automation is impossible as an operator has to perform a direction connection and a long operation time is needed for multiple channels.

To solve the above problem, the hand-wearable device 200 according to an embodiment further includes the electrode substrate 240 and the connection electrode 250 to easily connect the soft sensor to an external electronic device. The above description will be described in more detail below.

The electrode substrate 240 may be formed on the hand-wearable device 200 and function to connect an external electronic device (for example, a connector or the like) to the soft sensors. The electrode substrate 240 may be various circuit substrate such as a flexible printed circuit board (FPCB). The electrode substrate 240 may be in contact with or coupled to a connector (not shown).

The electrode substrate 240 may be formed by an insert print method. In other words, after forming the first elastic layer 111, the electrode substrate 240 is inserted and formed on the first elastic layer 111. The electrode substrate 240 may be located roughly on the first elastic layer 111 with being interrupted by a movement of a wrist and in an area which does not invade positions of the sensors 211, 212, 213, 221, 222, 231, 232, 260, and 270. In addition, the electrode substrate 240 may be located in an area capable of minimizing a distance between the sensors 211, 212, 213, 221, 222, 231, 232, 260, and 270 and the electrode substrate 240 to minimize a length of the wire unit 290. For example, the electrode substrate 240 may be formed on a back portion of a hand adjacent to the wrist. For durability, the periphery of the electrode substrate 240 may need to be reinforced with a hard material. Accordingly, it may be preferable to position the electrode substrate on the back portion of the hand instead of the wrist which moves flexibly.

The connection electrode 250 may function to connect the wire unit 140 of the soft sensor 100 to the electrode substrate 240. The connection electrode 250 may include a predetermined conductive material and may include a conductive material in a liquid or solid form which is capable to be coated. In an embodiment, the connection electrode 250 may include a conductive liquid metal that maintains a liquid state at room temperature and has conductivity. Herein, the conductive liquid metal is described as using EGaIn as an example.

The connection electrode 250 may be formed in a predetermined pattern by using a conductive liquid metal and the connection electrode 250 may be formed by the EGaIn by using various methods such as 3D printing, nozzle printing, inkjet printing, roll-to-roll printing, or the like.

According to the present disclosure, an electrode portion may be stably formed regardless of a thickness of the channel, a channel size, a number of channel, a material of a soft sensor, or the like. In addition, the electrode portion may be formed automatically by using a printing equipment, and thus, reducing an operation time. In addition, an electrode portion having a compact structure may be formed.

Furthermore, according to the present disclosure, a sensor unit, a wire unit, and a connection electrode may be formed by the same material and a material replacement process of a printer is not needed, and thus, a manufacturing process becomes simpler. In addition, in a case of printing a conductive paste, a heating process to harden a conductive paste such as silver at high temperature is needed. However, according to the present disclosure, an additional process is not needed, and thus, the manufacturing process becomes simpler.

FIG. 5 is a diagram illustrating a method of manufacturing the hand-wearable device having the soft sensor of FIG. 1.

Figure 5A:
FIGS. 5A to 5I are diagrams illustrating a method of manufacturing the hand-wearable device having the soft sensor of FIG. 1.

Referring to FIG. 5A, the first elastic material is coated on the base substrate 101. After coating the first elastic material, the first elastic material hardens when a predetermined time passes and forms the first elastic layer 111. Herein, FIG. 5A illustrates that a cross-section of the first elastic layer 111 includes a rectangular shape as an example, but the inventive concept is not limited thereto. The first elastic layer 111 may be formed in various sizes and shapes.

A glass wafer may be used as the base substrate 101.

Since the first elastic layer 111 has a very low thickness and good elasticity, the first elastic layer 111 may be manufactured in various shapes and sizes, and may be cut and used according to a desired shape.

Figure 5B:
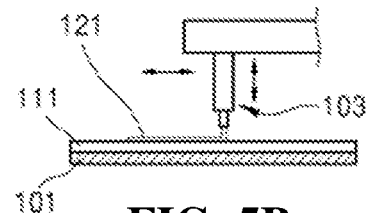
Figure 5C:
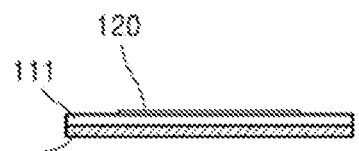

Next, referring to FIG. 5B, a conductive liquid metal is printed on the first elastic layer 111 by using a nozzle 103.

The EGaIn, which is the conductive liquid metal, may be accommodated in the nozzle 103. The nozzle 103 may be coupled to a computerized numerical control (CNC) equipment and may be controlled to be movable in directions of three axes. The CNC equipment may be a 3D printer and may include a three-axis controller, an injecting controller, a microscope, or the like.

The nozzle 103 may print the conductive liquid metal while moving in a predetermined path by a control of the three-axis controller. Paths in directions of three axes may be respectively set according to the channel patterns.

Herein, the channel pattern may be designed as a pattern of micro-channels desired by the user using the CAD. Since the channel pattern is designed by using the CAD, the size and number of the channel pattern are easy to be designed and modified. The shape, size, and number of channel patterns may be set according to a purpose, size, or the like of the soft sensor.

After designing the channel pattern, a G code is generated by using a CAM and the G code is modified by using a simulator, and then transferred to the three-axis controller. Accordingly, the channel pattern is easy to be designed and modified by using a CAD/CAM. In addition, there is no need to manufacture a separate mold to form the channel pattern.

When the conductive liquid metal is printed by the nozzle 103, the shape, size, and characteristics of the sensor unit 120 may be adjusted by adjusting process variables. Herein, the process variables may include an inner diameter of the nozzle 103, an injecting pressure of the nozzle 103, a distance between the nozzle 103 and the first elastic layer 111, and a transportation rate of the nozzle 103. By suitably combining the process variables, the shape and size of a desired sensor unit and a characteristic of the soft sensor may be adjusted. The process variables may be directly set by the user or may be set under an optimum condition by a preset program.

As the inner diameter of the nozzle 103 decreases, a width and a height of the cross-section of the sensor unit 120 may be decreased. The performance of the sensor unit may vary depending on the width and height of the cross-section of the sensor unit 120. When the width and height of the cross-section of the sensor unit 120 decreases, the sensitivity of the soft sensor increases.

The nozzle 103 is detachably coupled to the CNC equipment and may be replaceable. In addition, only a needle of the nozzle 103 may be replaceable.

As a pressure injecting the conductive liquid metal from the nozzle 103 increases, the width and height of the cross-section of the sensor unit 120 increase. The pressure of the nozzle 103 is controlled by a nozzle controller.

When a distance between the nozzle 103 and the first elastic layer 111 decreases, an area where a droplet of the conductive liquid metal formed at an end of the needle of the nozzle 103 in contact with the first elastic layer 111 varies. In other words, when the distance between the nozzle 103 and the first elastic layer 111 decreases, the size of the droplet increase, and thus, the width of the cross-section of the sensor unit increases. The distance between the nozzle 103 and the first elastic layer 111 may be controlled by controlling the height of the nozzle 103 by the three-axis controller.

When the transportation rate of the nozzle 103 increases, the height of the cross-section of the sensor unit 120 decreases. The transportation rate of the nozzle 103 is controlled by the three-axis controller.

Figure 5D:
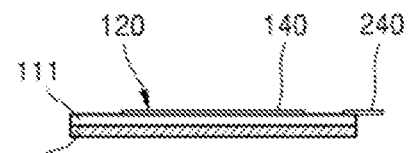

The conductive liquid metal is printed on the first elastic layer 111 by using the nozzle 103 to form the sensor unit 120 and the wire unit 140, as shown in FIG. 5D.

Next, referring to FIG. 5D, the electrode substrate 240 is arranged on one side of the wire unit 140. At least a portion of the electrode substrate 240 may be arranged on the first elastic layer 111 and a position of the electrode substrate 240 may be fixed by a glue or an adhesive tape.

Figure 5E:
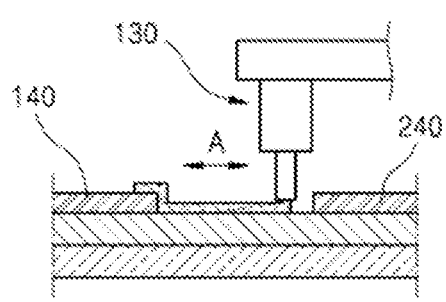

Then, referring to FIG. 5E, the connection electrode 250 connecting the wire unit 140 and the electrode substrate 240 is printed. The connection electrode 250 may be provided inside or on one side of the elastic sheet 110 and function to connect the wire unit 140 to the electrode substrate 240.

In a method of manufacturing the hand-wearable device according to an embodiment, a property of the conductive liquid metal such as EGaIn, which has high structural stability, is used to build a three-dimensional column and the column is dropped onto the electrode substrate 240 to form the connection electrode 250. In detail, when the conductive liquid metal such as EGaIn is printed, a very thin oxide film is formed on its surface. In other words, the interior of the conductive liquid metal is liquid but a thin film is formed on the outside, such that a shape of the interior liquid may be deformed to a certain extent. Accordingly, a process of lifting the conductive liquid metal high may be possible due to the oxide film. When cutting the conductive liquid metal, the thin film is burst open when the cutting is performed. When the conductive liquid metal is cut, the oxide film is burst, and the liquid inside the conductive liquid metal is exposed, the oxide film is formed immediately again. The above description will be described in more detail below.

First, referring to FIG. 5E, the nozzle 103 moves from one end of the wire unit 140 in a first direction (direction A) to a certain extent to print the conductive liquid metal. Accordingly, a portion of connection electrode 250 is formed and an end of the wire unit 140 is covered.

Figure 5F:
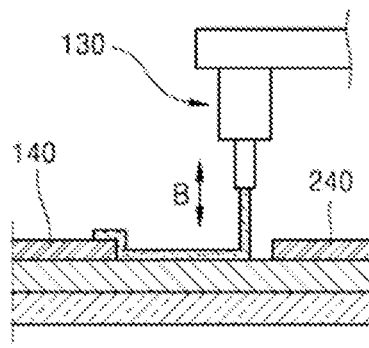

As described above, in a state where the nozzle 103 is printing and moving near the electrode substrate 240, the nozzle 103 moves in a second direction (direction B), that is, in the drawing, the nozzle 103 moves vertically, and the conductive liquid metal made to be erect in the vertical direction, as shown in FIG. 5F. In detail, the conductive liquid metal such as EGaIn has high viscosity and structural stability, therefore, the conductive liquid metal may be made erect in the vertical direction up to a certain height. By using the property of the conductive liquid metal, the nozzle 103 is continuously moved in the vertical direction while the conductive liquid metal is continuously sprayed. Therefore, the connection electrode 250 including the conductive liquid metal is made erect in the vertical direction. The connection electrode 250 may be made erect vertically to a height sufficient to cover one end of the electrode substrate 240 when the connection electrode 250 falls down.

Figure 5G:
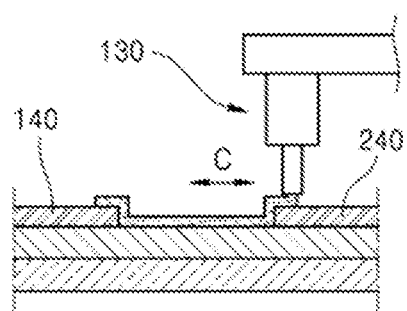
Figure 5H:
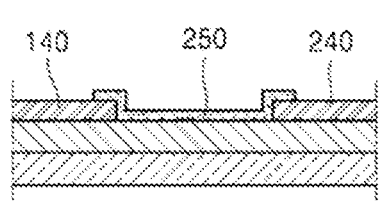

When the connection electrode 250 is made erect to a sufficient height, the nozzle 103 is moved to a direction C and an end portion of the connection electrode 250 connected to the nozzle 103 is seated on an upper portion of the electrode substrate 240, as shown in FIG. 5G. In other words, as described above, the connection electrode 250 is formed at a height high enough to cover the one end of the electrode substrate 240 and when the connection electrode 250 completely falls off, the connection electrode 250 covers the one end of the electrode substrate 240. Next, when the end portion of the connection electrode 250 connected to the nozzle 103 is cut by using a vacuum pressure, as a result, the connection electrode 250 is formed as one end covering the end of the wire unit 140 and the other end covering the end of electrode substrate 240 and functions to electrically connect the wire unit 140 to the electrode substrate 240, as shown in FIG. 5H.

Figure 5I:
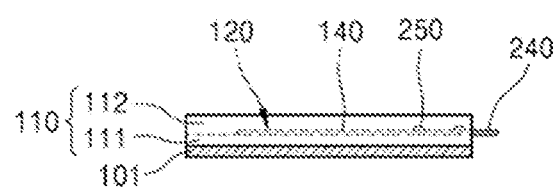

Next, referring to FIG. 5I, the second elastic material is coated on the first elastic layer 111 on which the sensor unit 120, the wire unit 140, the connection electrode 250, or the like, are formed to form the second elastic layer 112. When the second elastic layer 112 is hardened, the second elastic layer 112 is cut into a desired shape such as a shape of a hand or glove by using various methods such as laser cutting, cutting machine, knife mold, or the like. Finally, the elastic sheet 110 may be removed from the base substrate 101 to complete a soft sensor and a hand-wearable device having the soft sensor.

In the soft sensor manufactured in the above method, since the sensor unit 120 maintains a liquid state between the first elastic layer 111 and the second elastic layer 112, the elasticity of the sensor unit 120 may be maintained.

In addition, the soft sensor may be made with a thickness less than that of using a mold, and the channel pattern may be easily designed and changed by using the CAD/CAM.

According to the method, a process of connecting the wire unit 140 to the electrode substrate 240 may be automated by using a printing equipment, and thus, an operation time may be reduced. Furthermore, according to the present disclosure, a sensor unit and a connection electrode may be formed by the same material and a material replacement process of a printer is not needed, and thus, a manufacturing process becomes simpler. In addition, in a case of printing a conductive paste, a heating process to harden a conductive paste such as silver at high temperature is needed. However, according to the present disclosure, an additional process is not needed, and thus, the manufacturing process becomes simpler.

Figure 6:
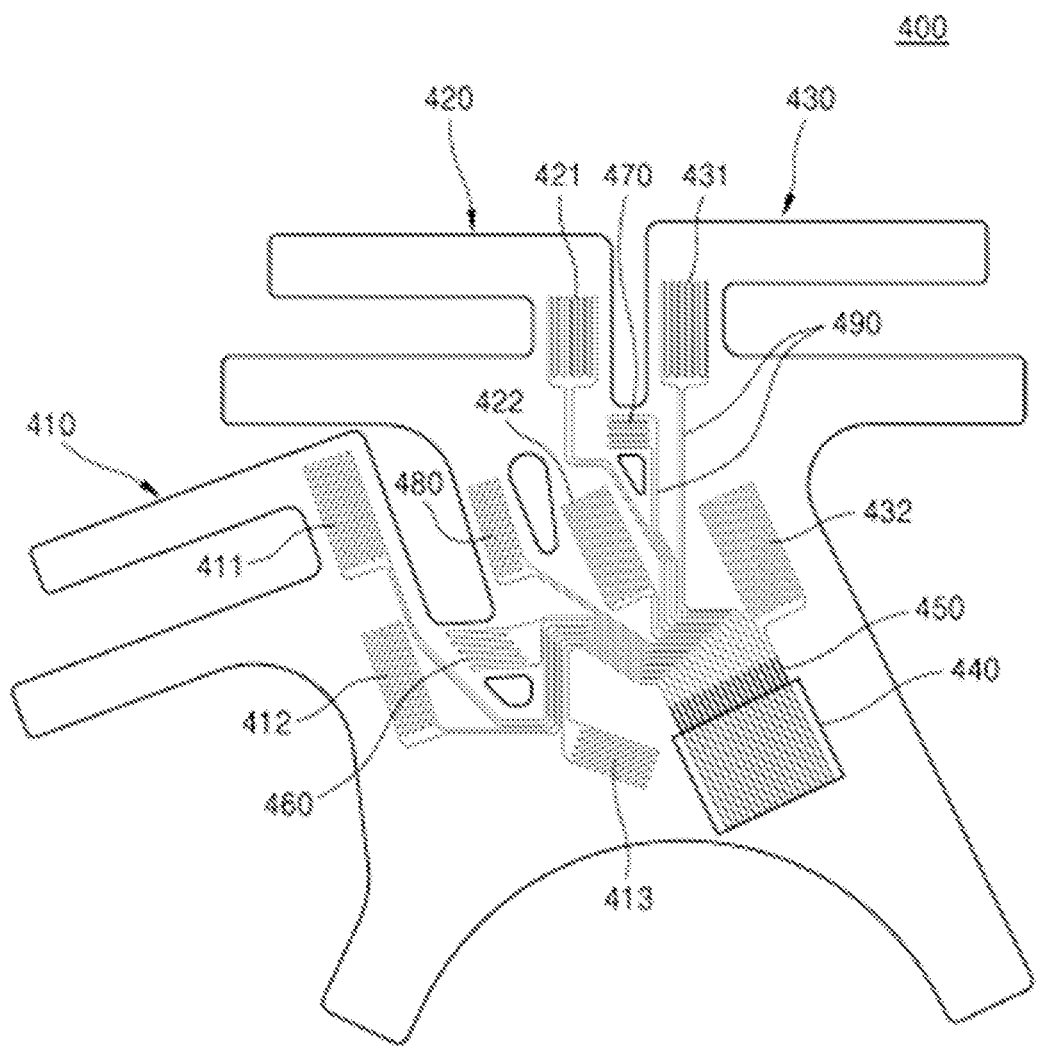
FIG. 6 is a plan view of a hand-wearable device according to another embodiment.
Figure 7:
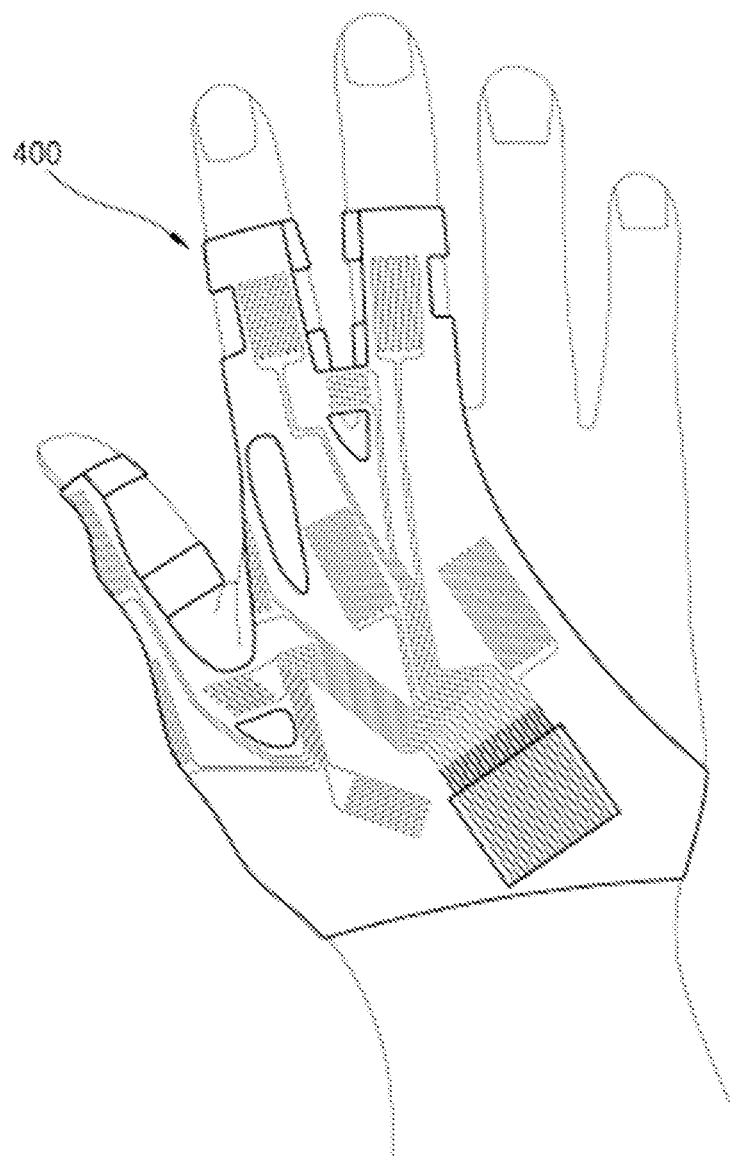
FIG. 7 is a perspective view illustrating a state in which the hand-wearable device of FIG. 6 is worn on a hand.

FIG. 6 is a plan view of a hand-wearable device according to another embodiment. FIG. 7 is a perspective view illustrating a state in which the hand-wearable device of FIG. 6 is worn.

Referring to FIGS. 6 and 7, a hand-wearable device 400 includes the thumb sensing unit 410, the index finger sensing unit 420, and the middle finger sensing unit 430. Although not illustrated in the drawing, the hand-wearable device 400 may further include a ring finger sensing unit and a little finger sensing unit.

In addition, the hand-wearable device 400 includes a first adduction/abduction measuring sensor 460 between the thumb sensing unit 410 and the index finger sensing unit 420 and a second adduction/abduction measuring sensor 470 between the index finger sensing unit 420 and the middle finger sensing unit 430. In addition, the hand-wearable device 400 includes a third adduction/abduction measuring sensor 480 formed on one side of the index finger sensing unit 420 and measuring the adduction and abduction of the index finger.

Although not illustrated in the drawing, the hand-wearable device 400 may further include a fourth adduction/abduction measuring sensor (not shown) between the middle finger sensing unit 430 and the ring finger sensing unit (not shown) and a fifth adduction/abduction measuring sensor (not shown) between the ring finger sensing unit (not shown) and the little finger sensing unit (not shown).

The thumb sensing unit 410 may include a first thumb portion sensor 411, a second thumb portion sensor 412, and a third thumb portion sensor 413. The first thumb portion sensor 411 may measure the bending and stretching between the distal phalanx and proximal phalanx of the thumb. The second thumb portion sensor 412 may measure the bending and stretching between the proximal phalanx and the metacarpals of the thumb. The third thumb portion sensor 413 may measure the bending and stretching between the metacarpals and carpals of the thumb.

The index finger sensing unit 420 may include a first index finger portion sensor 421 and a second index finger portion sensor 422. The first index finger portion sensor 421 may measure the bending and stretching between the middle phalanx and the proximal phalanx of the index finger. The second index finger portion sensor 422 may measure the bending and stretching between the proximal phalanx and the metacarpals of the index finger.

The middle finger sensing unit 430 may include a first middle finger portion sensor 431 and a second middle finger portion sensor 432. The first middle finger portion sensor 431 may measure the bending and stretching between the middle phalanx and the proximal phalanx of the index finger. The second middle finger portion sensor 432 may measure the bending and stretching between the proximal phalanx and the metacarpals of the index finger.

The first adduction/abduction measuring sensor 460 may be between the thumb sensing unit 410 and the index finger sensing unit 420 and measure the adduction and abduction of the thumb.

The second adduction/abduction measuring sensor 470 may be between index finger sensing unit 420 and the middle finger sensing unit 430 and measure the adduction and abduction of the middle finger.

The third adduction/abduction measuring sensor 480 may be formed on one side of the index finger sensing unit 420 and measure the adduction and abduction of the index finger.

The hand-wearable device according to an embodiment may further include the third adduction/abduction measuring sensor 480 on one side of the index finger to separate a signal of an adduction/abduction measuring sensor from a signal of a bending/stretch measuring sensor. That is, in a case of FIG. 3, since the adduction and abduction of the index finger and the middle finger may not be measured independently, in this embodiment, the third adduction/abduction measuring sensor 480 may be further provided on the one side of the index finger to independently measure the adduction and abduction of the index finger and middle finger.

Herein, each of the first thumb portion sensor 411, the second thumb portion sensor 412, the third thumb portion sensor 413, the first index finger portion sensor 421, the second index finger portion sensor 422, the first middle finger portion sensor 431, the second middle finger portion sensor 432, the first adduction/abduction measuring sensor 460, the second adduction/abduction measuring sensor 470, and the third adduction/abduction measuring sensor 480 may be the sensor unit 120 of the soft sensor 100 of FIG. 1. In addition, each wire unit 490 extending from each of the sensors 411, 412, 413, 421, 422, 431, 432, 460, 470, and 480 may be the wire unit 140 of the soft sensor 100 of FIG. 1.

Although the drawing shows a hand-wearable device worn on three fingers of thumb, index finger, and middle finger and soft sensors arranged on the hand-wearable device, the inventive concept is not limited thereto. In other words, the soft sensors corresponding to all five fingers or some of the fingers, may be arranged on the hand-wearable device, or some soft sensors may be added or omitted in each finger.

MODE OF DISCLOSURE

Second Embodiment

Hereinafter, embodiments of the present disclosure will now be described with reference to the accompanying drawings.

FIG. 8 is a diagram illustrating a method of manufacturing a hand-wearable device having a soft sensor according to an embodiment.

Figure 8A:
FIGS. 8A to 8S show diagrams illustrating a method of manufacturing a hand-wearable device having a soft sensor according to a second embodiment.

Referring to FIG. 8A, the first elastic material is coated on a base substrate 501. After coating the first elastic material, the first elastic material hardens when a predetermined time passes and forms a first elastic layer 511. Herein, FIG. 8A illustrates that a cross-section of the first elastic layer 511 includes a rectangular shape as an example, but the inventive concept is not limited thereto. The first elastic layer 511 may be formed in various sizes and shapes.

A glass wafer may be used as the base substrate 501.

Since the first elastic layer 511 has a very low thickness and good elasticity, the first elastic layer 511 may be manufactured in various shapes and sizes, and may be cut and used according to a desired shape.

Figure 8B:
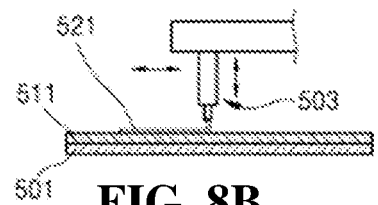

Next, referring to FIG. 8B, a conductive liquid metal is printed on the first elastic layer 511 by using a nozzle 503. The EGaIn, which is the conductive liquid metal, may be accommodated in the nozzle 503. The nozzle 503 may be coupled to a CNC equipment and may be controlled to be movable in directions of three axes. The CNC equipment may be a 3D printer and may include a three-axis controller, an injecting controller, a microscope, or the like.

Figure 8C:
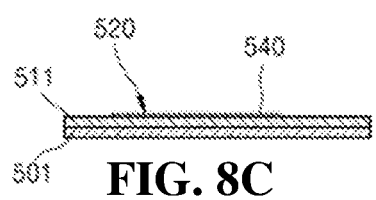

The conductive liquid metal is printed on the first elastic layer 511 by using the nozzle 503 to form a sensor unit 520 and the wire unit 540, as shown in FIG. 8C.

Figure 8D:
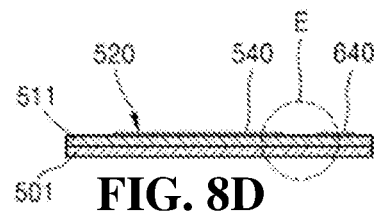

Next, referring to FIG. 8D, an electrode substrate 640 is arranged on one side of the wire unit 540. At least a portion of the electrode substrate 640 may be arranged on the first elastic layer 511 and a position of the electrode substrate 640 may be fixed by a glue or an adhesive tape.

Figure 8E:
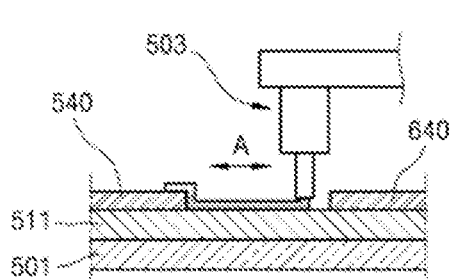

Then, referring to FIG. 8E, a junction unit 650 connecting the wire unit 540 and the electrode substrate 640 is printed. The junction unit 650 may be provided inside or on one side of the elastic sheet 510 and function to connect the wire unit 540 to the electrode substrate 640.

In a method of manufacturing the hand-wearable device according to an embodiment, a property of the conductive liquid metal such as EGaIn, which has high structural stability, is used to build a three-dimensional column and the column is dropped onto the electrode substrate 640 to form the junction unit 650. In detail, when a conductive liquid metal such as EGaIn is printed, a very thin oxide film is formed on its surface. In other words, the interior of the conductive liquid metal is liquid but a thin film is formed outside, such that a shape of the interior liquid may be deformed to a certain extent. Accordingly, a process of lifting the conductive liquid metal high may be possible due to the oxide film. When cutting the conductive liquid metal, the cutting is performed as bursting the thin film. When the conductive liquid metal is cut, the oxide film is burst, and the liquid inside the conductive liquid metal is exposed, the oxide film is formed immediately again. The above description will be described in more detail below.

FIG. 8E is an enlarged of a portion E of FIG. 8D. First, referring to FIG. 8E, the nozzle 503 moves from one end of the wire unit 540 in a first direction (direction A) to a certain extent to print the conductive liquid metal. Accordingly, a portion of junction unit 650 is formed and an end of the wire unit 540 is covered.

Figure 8F:
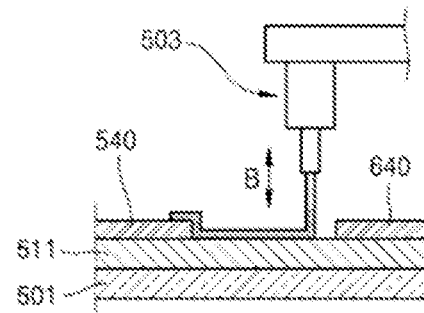

As described above, in a state where the nozzle 503 is printing and moving near the electrode substrate 640, the nozzle 503 moves in a second direction (direction B), that is, in the drawing, the nozzle 503 moves vertically, and the conductive liquid metal is made erect in the vertical direction, as shown in FIG. 8F. In detail, the conductive liquid metal such as EGaIn has high viscosity and structural stability, therefore, the conductive liquid metal may be made erect in the vertical direction up to a certain height. By using the property of the conductive liquid metal, the nozzle 503 is continuously moved in the vertical direction while the conductive liquid metal is continuously sprayed. Therefore, the junction unit 650 including the conductive liquid metal is made erect in the vertical direction. The junction unit 650 may be made erect vertically to a height sufficient to cover one end of the electrode substrate 640 when the junction unit 650 falls down.

Figure 8G:
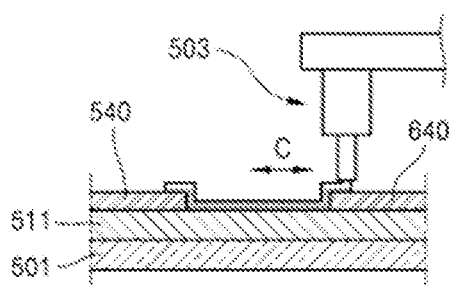
Figure 8H:
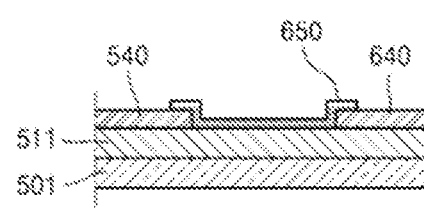

The junction unit 650 is made erect to a sufficient height, the nozzle 503 is moved to a direction C and an end portion of the junction unit 650 connected to the nozzle 503 is seated on an upper portion of the electrode substrate 640, as shown in FIG. 8G. In other words, the junction unit 650 is formed at a height high enough to cover the one end of the electrode substrate 640 and when the junction unit 650 completely falls off, the junction unit 650 covers the one end of the electrode substrate 640. Next, when the end portion of the junction unit 650 connected to the nozzle 503 is cut by using a vacuum pressure, as a result, the junction unit 650 is formed as one end covering the end of the wire unit 540 and the other end covering the end of electrode substrate 640 and functions to electrically connect the wire unit 540 to the electrode substrate 640, as shown in FIG. 5H.

Figure 8I:
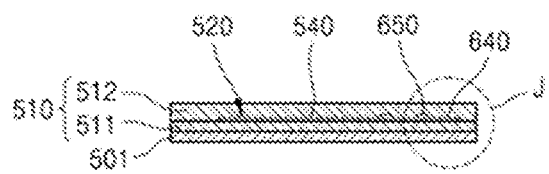

Next, referring to FIG. 8I, the second elastic material is coated on the first elastic layer 511 on which the sensor unit 520, the wire unit 540, the junction unit 650, or the like, are formed to form the second elastic layer 512.

Figure 8J:
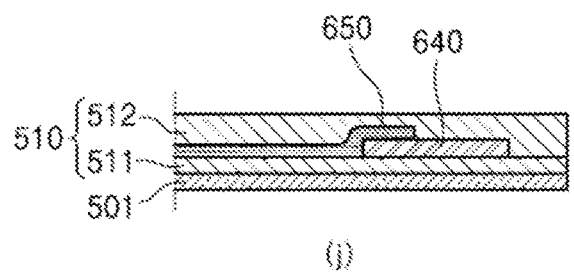
Figure 8K:
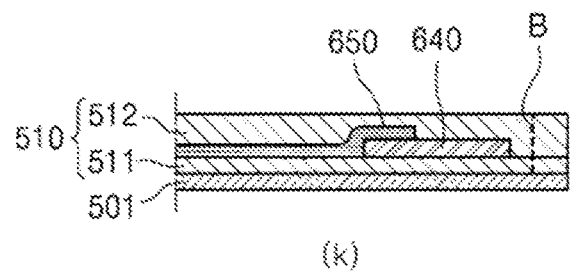
Figure 8L:
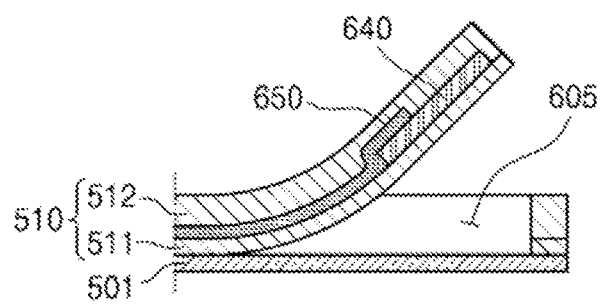

FIG. 8J is an enlarged portion of a portion J of FIG. 8. In a state where the electrode substrate 640 and the junction unit 650 are embedded in the second elastic layer 512 as shown in FIG. 8J, a portion of the elastic sheet 510 is cut along an edge B of a portion where the electrode substrate 640 and the junction unit 650 are formed in the hand-wearable device to form a incision (see 605 of FIG. 8I). In this case, an area in which the wire unit 540 connected to the junction unit 650 is formed may not be cut.

Next, as shown in FIG. 8I, a cut portion is lifted to expose the incision 605 to the outside.

Figure 8M:
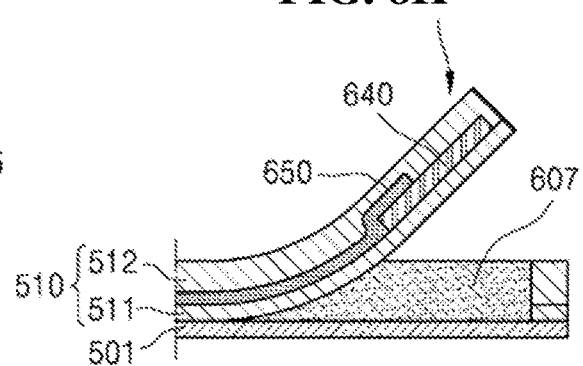

In the above state, as shown in FIG. 8M, an elastic material is coated in the incision 605 to form a filling portion 607. The elastic material filled in the incision 605 may be the same material as the elastic material forming the elastic sheet 510. As described above, when the elastic material is coated in the incision 605 to form the filling portion 607, a portion where the electrode substrate 640 and the junction unit 650 are formed forms an extending portion that protrudes from a main body of the elastic sheet 510. In other words, the extending portion 601 including the electrode substrate 640 and the junction unit 650 may be expressed as forming branching from the main body of the elastic sheet 510. When the elastic material is not used to reinforce an empty space of the incision 605, a tension and shape of the entire hand-wearable device 600 may not be maintained.

Figure 8N:
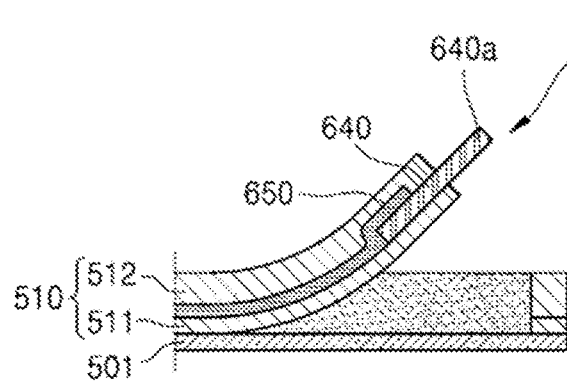

In this state, as shown in FIG. 8N, the elastic sheet 510 formed at an end portion 640a of the electrode substrate 640 is separated to expose the end portion 640a of the electrode substrate 640 to the outside. The electrode substrate 640 may be electrically connected to an external connector (see 310 of FIG. 8R) through the end portion 640a of the electrode substrate 640 exposed to the outside.

Figure 8O:
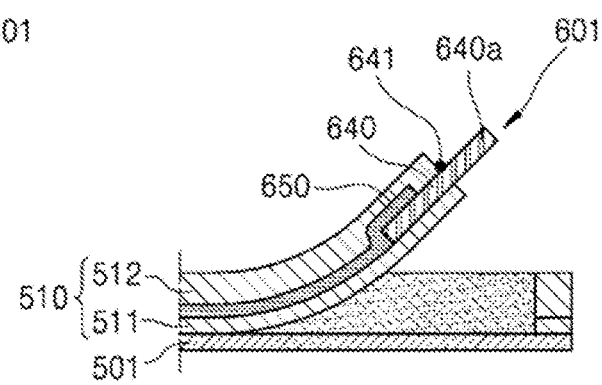
Figure 8P:
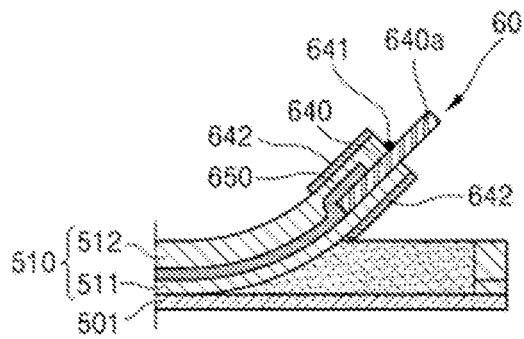

Next, as shown in FIG. 8O, a glue or the like may be used in at least a portion of a boundary portion of the electrode substrate 640 and the elastic sheet 510, in particular, a boundary portion of the electrode substrate 640 adjacent to the junction unit 650 to form a sealing portion 641.

Figure 8Q:
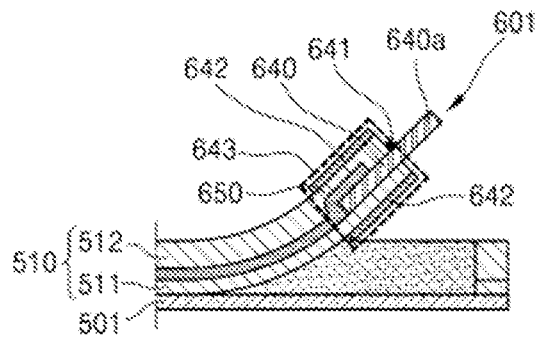

As shown in FIG. 8Q, a reinforcement portion 642 is formed on at least one surface of the extending portion 601. That is, the reinforcement portion 642 including a non-elastic film or the like may be further included to improve durability of the extending portion 601. The reinforcement portion 642 may be formed to cover an upper surface of the elastic sheet 510. Since the conductive liquid metal comes together and rises high as large droplets, and the thickness of the silicone layer remains so small, the reinforcement portion 642 should be formed to cover the upper surface of the elastic sheet 510. Furthermore, the reinforcement portion 642 may also be formed on a bottom surface of the elastic sheet 510 (that is, between the elastic sheet 510 and the extending portion 601). The extending portion 601 and the reinforcement portion 642 may be combined by using a glue or the like.

Although not illustrated in the drawing, one more silicone layer may be further coated before attaching the reinforcement portion 642 to the elastic sheet 510. When the reinforcement portion 642 including the non-elastic film is directly attached to the thin silicone film with a non-elastic glue (such as Loctite), stress may be concentrated between the non-elastic portion and the elastic portion when the sensor is tensioned, thereby easily tearing the reinforcement portion.

Figure 8R:
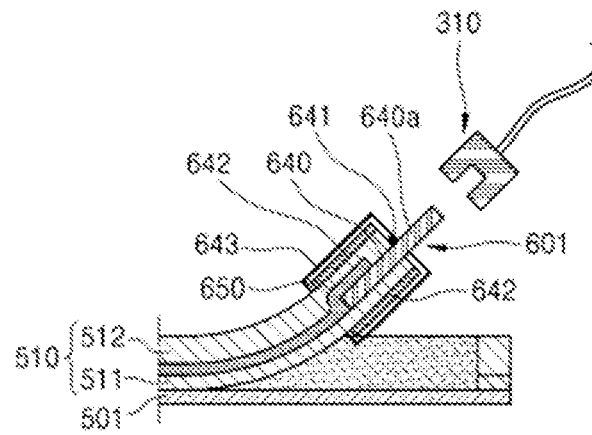

As shown in FIG. 8Q, a finishing treatment may be performed with respect to the extending portion 610 by forming a protective portion 643 surrounding a remaining portion of the extending portion 601 except for the end portion 640a of the electrode substrate 640. As shown in FIG. 8R, the extending portion 601 may be better protected by forming the protective portion 643 in the form of a shrinkable tube and contracting the protective portion 643 while the protective portion 643 is formed to surround the extending portion 601.

Figure 8S:
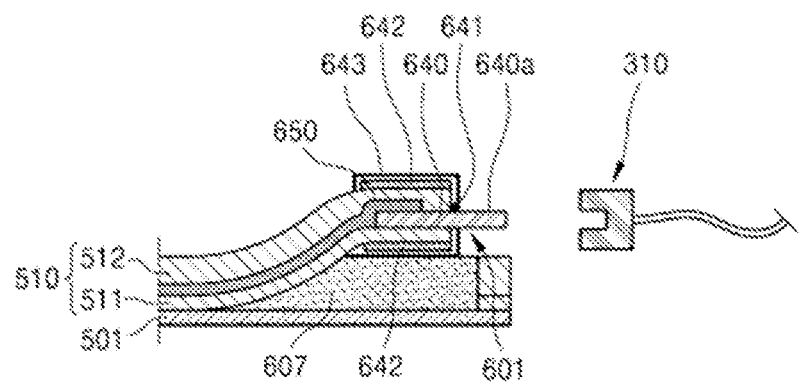

As shown in FIG. 8S, the extending portion 601 and the main body of the elastic sheet 510 are coupled. That is, a bottom surface of the extending portion 601 and the filling portion facing to each other are coupled by using a glue or the like. A reason of coupling the extending portion 601 and the main body of the elastic sheet 510 is that, when the extending portion 601 may be free to move, weight or shearing force may be continuously received to lead to low durability and the extending portion 601 affects a sensor signal when being frayed. Accordingly, after exposing the end portion 640a of the electrode substrate 640 to the outside through the above process, the extending portion 601 branched from the main body of the elastic sheet 510 is attached to the main body of the elastic sheet 510 again to be used.

When the extending portion 601 exposing the end portion 640a of the electrode substrate 640 is formed, the end portion 640a of the electrode substrate 640 may be electrically connected to the external connector 310.

As a result, although not illustrated in the drawing, a soft sensor sheet may be cut into a shape desired by the user such as a shape of a hand or glove by using methods such as laser cutting, cutting machine, knife mold, or the like. In this state, the elastic sheet 510 may be removed from the base substrate 501 to complete a soft sensor and a hand-wearable device having the soft sensor.

In the soft sensor manufactured in the above method, since the sensor unit 520 maintains a liquid state between the first elastic layer 511 and the second elastic layer 512, the elasticity of the sensor unit 520 may be maintained.

In addition, the soft sensor may be made with a thickness less than that of using a mold, and the channel pattern may be easily designed and changed by using the CAD/CAM.

According to the method, a process of connecting the wire unit 540 to the electrode substrate 640 may be automated by using a printing equipment, and thus, an operation time may be reduced. Furthermore, according to the present disclosure, a sensor unit and a junction unit may be formed by the same material and a material replacement process of a printer is not needed, and thus, a manufacturing process becomes simpler. In addition, in a case of printing a conductive paste, a heating process to harden a conductive paste such as silver at high temperature is needed. However, according to the present disclosure, an additional process is not needed, and thus, the manufacturing process becomes simpler.

Figure 9:
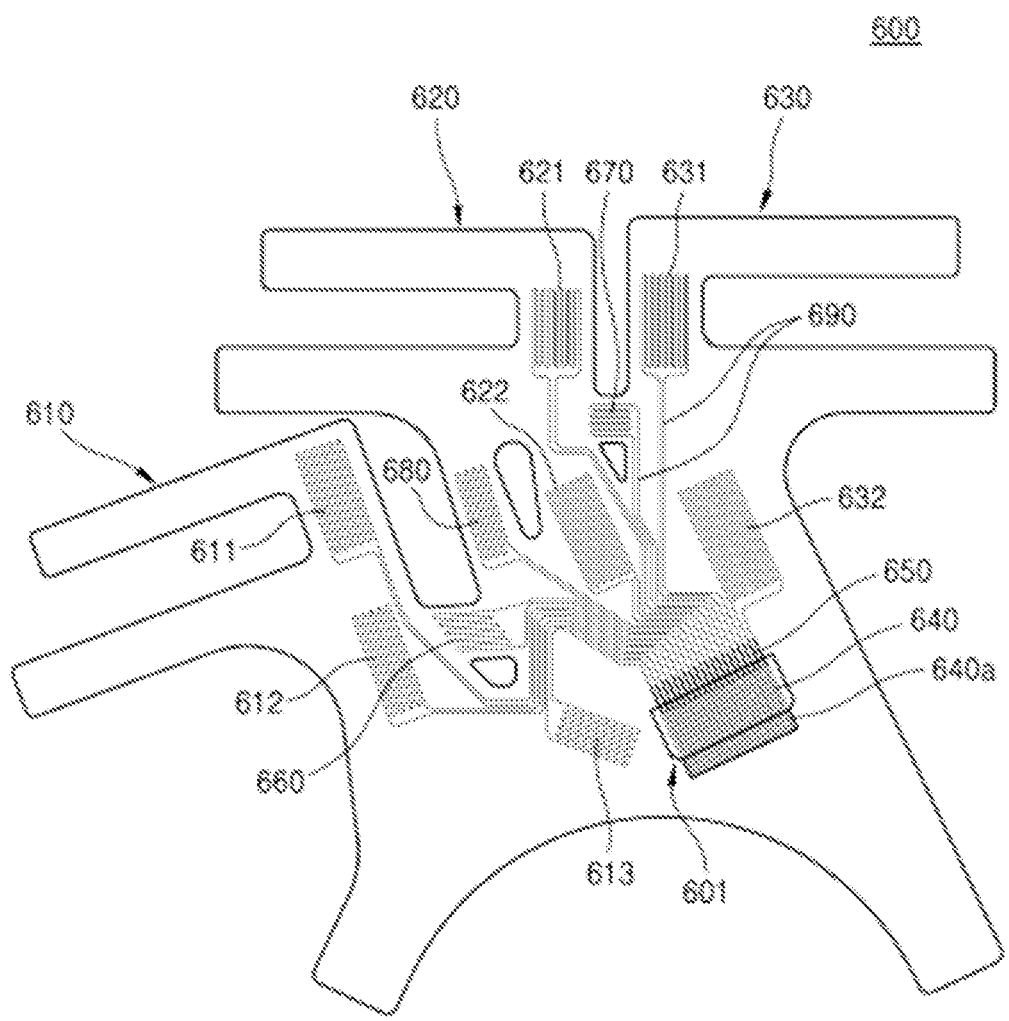
FIG. 9 is a plan view of a hand-wearable device having the soft sensor of FIGS. 8A-8C.
Figure 10:
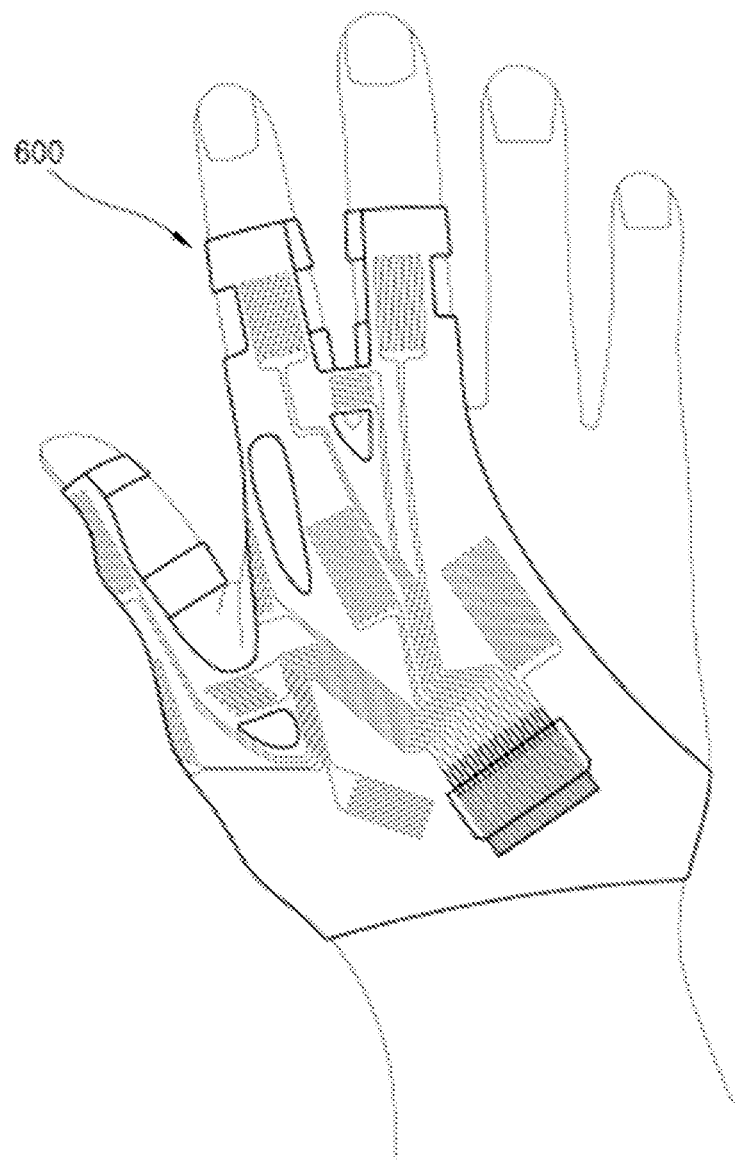
FIG. 10 is a plan view illustrating a state in which the hand-wearable device of FIGS. 8A-8C is worn on a hand.
Figure 11:
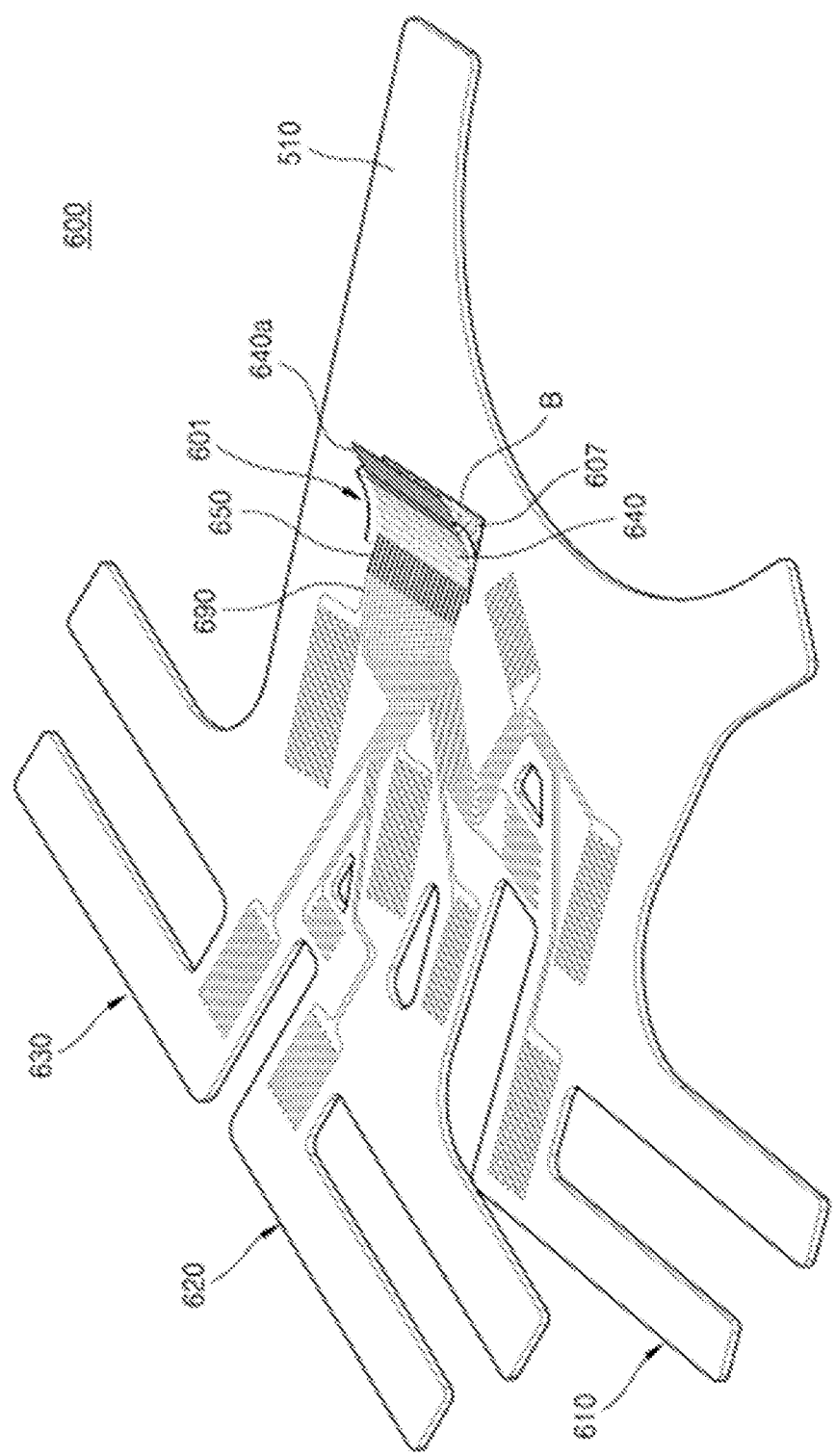
FIG. 11 is a perspective view of the hand-wearable device of FIG. 9.

FIG. 9 is a plan view of a hand-wearable device having the soft sensor of FIG. 2. FIG. 10 is a plan view illustrating a state in which the hand-wearable device of FIG. 9 is worn on hand. FIG. 11 is a perspective view of the hand-wearable device of FIG. 9.

Referring to FIGS. 9, 10, and 11, the hand-wearable device 600 may be a sheet of elastic material, in which a plurality of soft sensors 500 are formed to correspond to each joint of a finger. The hand-wearable device 600 of the present embodiment is generally similar to the embodiment of FIG. 6 and the electrode substrate 640 and the junction unit 650 are different in characteristics, which will be described in detail below.

The hand-wearable device 600 according to an embodiment further includes the electrode substrate 640 and the junction unit 650.

In a case of a hand-wearable device in the related art, the hand-wearable device is manufactured by cutting a portion of a surface of a soft sensor to reveal a cross-section of a channel and then directly inserting wire and a fixing method by a glue or a non-elastic film is used to prevent the inserted wire from coming off. However, in a case of the above method, there is a problem of a higher difficulty of electrode insertion as a thickness of the soft sensor decreases and a material of a sensor is softer. Furthermore, there is a problem that automation is impossible as an operator has to perform a direction connection and a long operation time is needed for multiple channels.

To solve the above problem, the hand-wearable device 600 according to an embodiment further includes the electrode substrate 640 and the junction unit 650 to easily connect the soft sensor to an external electronic device. The above description will be described in more detail below.

The electrode substrate 640 may be formed on the hand-wearable device 600 and function to connect an external electronic device (for example, a connector or the like) to the soft sensors. The electrode substrate 640 may be various circuit substrates such as a FPCB. The electrode substrate 640 may be in contact with or coupled to a connector (see 310 of FIG. 8S).

The electrode substrate 640 may be formed by an insert print method. In other words, after forming the first elastic layer (see 511 of FIG. 8A), the electrode substrate 640 is inserted and formed on the first elastic layer 511. The electrode substrate 640 may be located roughly on the first elastic layer (see 511 of FIG. 8A) with being interrupted by a movement of a wrist and in an area which does not invade positions of the sensors 611, 212, 213, 221, 222, 231, 232, 260, and 270. In addition, the electrode substrate 640 may be located in an area capable of minimizing a distance between the sensors 611, 212, 213, 221, 222, 231, 232, 260, and 270 and the electrode substrate 640 to minimize a length of the wire unit 690. For example, the electrode substrate 640 may be formed on a back portion of a hand adjacent to the wrist. For durability, a periphery of the electrode substrate 640 may need to be reinforced with a hard material. Accordingly, it may be preferable to position the electrode substrate on the back portion of the hand instead of the wrist which moves flexibly. A formation position and method of the electrode substrate 640 will be described in more detail below.

The junction unit 650 may function to connect the wire unit 540 of the soft sensor 500 to the electrode substrate 640. The junction unit 650 may include a predetermined conductive material and may include a conductive material in a liquid or solid form which is capable to be coated. In an embodiment, the junction unit 650 may include a conductive liquid metal that maintains a liquid state at room temperature and has conductivity. Herein, the conductive liquid metal is described as using EGaIn as an example.

The junction unit 650 may be formed in a predetermined pattern by using a conductive liquid metal and the junction unit 650 may be formed by the EGaIn by using various methods such as 3D printing, nozzle printing, inkjet printing, roll-to-roll printing, or the like.

At least a portion of the electrode substrate 640 and the junction unit 650 connected to the electrode substrate 640 may form the extending portion 601 extending outward from the elastic sheet 510. The above description will be described in more detail below.

Ina state where the electrode substrate 640 and the junction unit 650 are embedded in the second elastic layer (see 512 of FIG. 8I), a portion of the elastic sheet 510 is cut along the edge B of a portion where the electrode substrate 640 and the junction unit 650 are formed in the hand-wearable device to form a incision (see 605 of FIG. 8I). A side where the wire unit 540 connected to the junction unit 650 is formed may not be cut. A cut portion is lifted and the incision portion (see 605 of FIG. 8I) is exposed to the outside, and an elastic material is coated in the incision portion (see 605 of FIG. 8I) to form the filling portion (see 607 of FIG. 8M). The elastic material filled in the incision (see 605 of FIG. 8) to may be the same material as the elastic material forming the elastic sheet 510. When the elastic material is not coated in the incision (see 605 of FIG. 8 to form the filling portion (see 607, a portion where the electrode substrate 640 and the junction unit 650 are formed forms the extending portion 601 that protrudes from the main body of the elastic sheet 510. In other words, the extending portion 601 including the electrode substrate 640 and the junction unit 650 may be expressed as forming branching from the main body of the elastic sheet 510.

In this case, the end portion 640a of the electrode substrate 640 may be exposed to the outside and the electrode substrate 640 may be electrically connected to the external connector (see 310 of FIG. 8R). That is, the elastic sheet 510 formed at the end portion 640a of the electrode substrate 640 is separated to expose the end portion 640a of the electrode substrate 640.

Although not illustrated in the drawing, the sealing portion (see 641 of FIG. 8R), the reinforcement portion (see 642 of FIG. 8R), and the protective portion (see 643 of FIG. 8R) may be further formed in the extending portion 601.

A glue or the like may be used in at least a portion of a boundary portion of the electrode substrate 640 and the elastic sheet 510, in particular, a boundary portion of the electrode substrate 640 adjacent to the junction unit 650 to form the sealing portion (see 641 of FIG. 8R) to prevent the leakage of the junction unit 650 including the conductive liquid metal.

The reinforcement portion (see 642 of FIG. 8R) may be formed on at least one side of the extending portion 601. That is, the reinforcement portion (see 642 of FIG. 8R) including a non-elastic film or the like may be further included to improve durability of the extending portion 601. The reinforcement portion (see 642 of FIG. 8R) may be formed to cover an upper surface of the elastic sheet 510. Since the conductive liquid metal bands together and comes up high in a large droplet form and a thickness of the silicone layer remains so small, the reinforcement portion (see 642 of FIG. 8R) should be formed to cover the upper surface of the elastic sheet 510. Furthermore, the reinforcement portion (see 642 of FIG. 8R) may also be formed on a bottom surface of the elastic sheet 510 (that is, between the elastic sheet 510 and the extending portion 601). The extending portion 601 and the reinforcement portion (see 642 of FIG. 8R) may be combined by using a glue or the like.

Although not illustrated in the drawing, one more silicone layer may be further coated before attaching the reinforcement portion (see 642 of FIG. 8R) to the elastic sheet 510. When the reinforcement portion (see 642 of FIG. 8R) including the non-elastic film is directly attached to the thin silicone film with a non-elastic glue (such as Loctite), stress may be concentrated between the non-elastic portion and the elastic portion when the sensor is tensioned, thereby easily tearing the silicone layer.

A finishing treatment may be performed with respect to the extending portion 610 by forming a protective portion (see 643 of FIG. 8R) surrounding a remaining portion of the extending portion 601 except for the end portion 640a of the electrode substrate 640. The extending portion 601 may be better protected by forming the protective portion (see 643 of FIG. 8R) in a form of a shrinkable tube and contracting the protective portion (see 643 of FIG. 8R) while being formed to surround the extending portion 601.

According to the above embodiment, the electrode substrate 640 is branched from the main body of the soft sensor 500 to be connected to a connector. In addition, a strong electrode portion may be formed by fixing the extending portion 601 on the main body of the soft sensor 500 and forming the reinforcement portion (see 642 of FIG. 8R). As a result, signal disturbance due to external force may be minimized and durability may be improved.

According to the present disclosure, an electrode portion may be stably formed regardless of a thickness of the channel, a channel size, a number of channel, a material of a soft sensor, or the like. In addition, the electrode portion may be formed automatically by using a printing equipment, and thus, reducing an operation time. In addition, an electrode portion having a compact structure may be formed.

Furthermore, according to the present disclosure, a sensor unit, a wire unit, and a junction unit may be formed by the same material and a material replacement process of a printer is not needed, and thus, a manufacturing process becomes simpler. In addition, in a case of printing a conductive paste, a heating process to harden a conductive paste such as silver at high temperature is needed. However, according to the present disclosure, an additional process is not needed, and thus, the manufacturing process becomes simpler.

Third Embodiment

Figure 12:
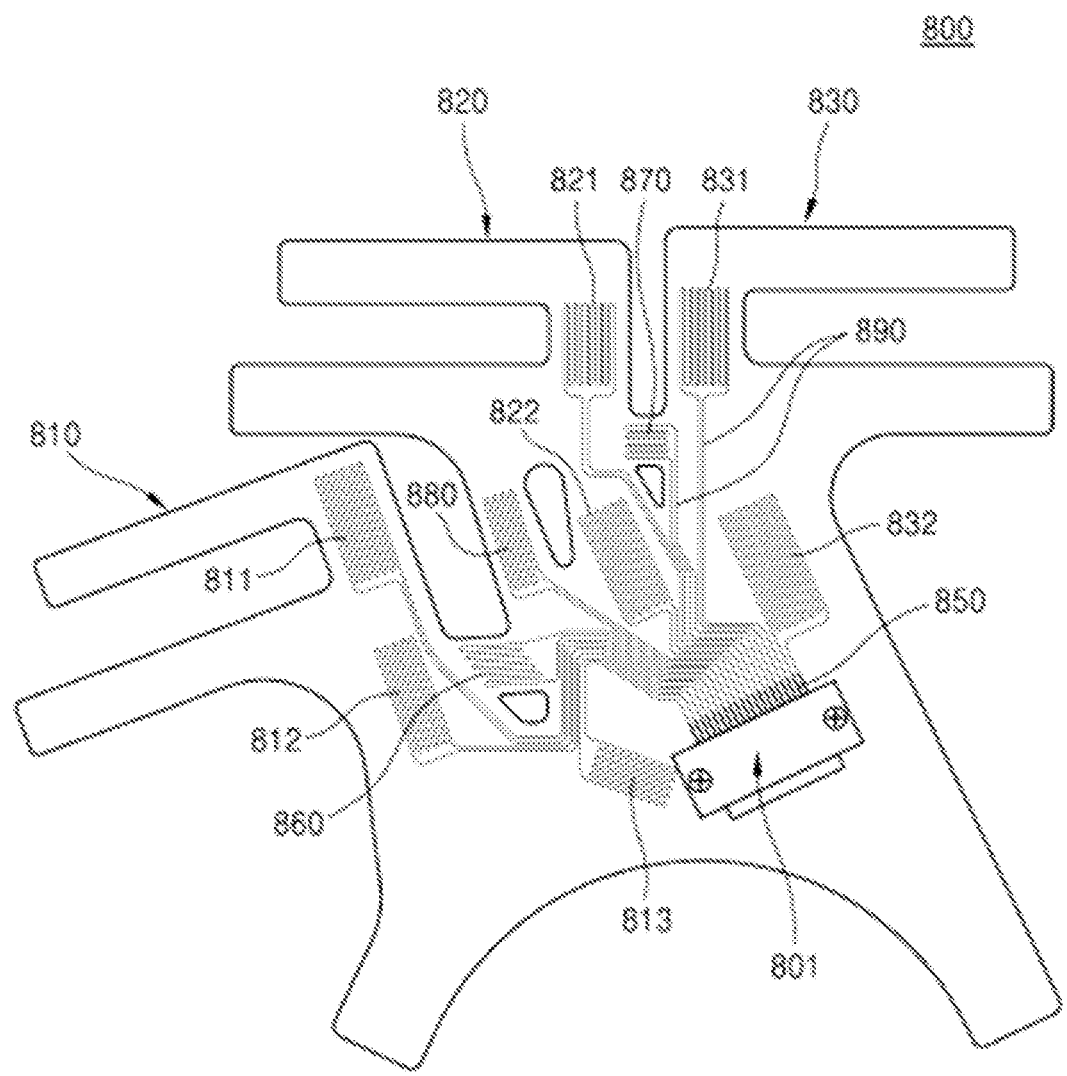
FIG. 12 is a plan view of a hand-wearable device having a soft sensor according to a third embodiment.
Figure 13:
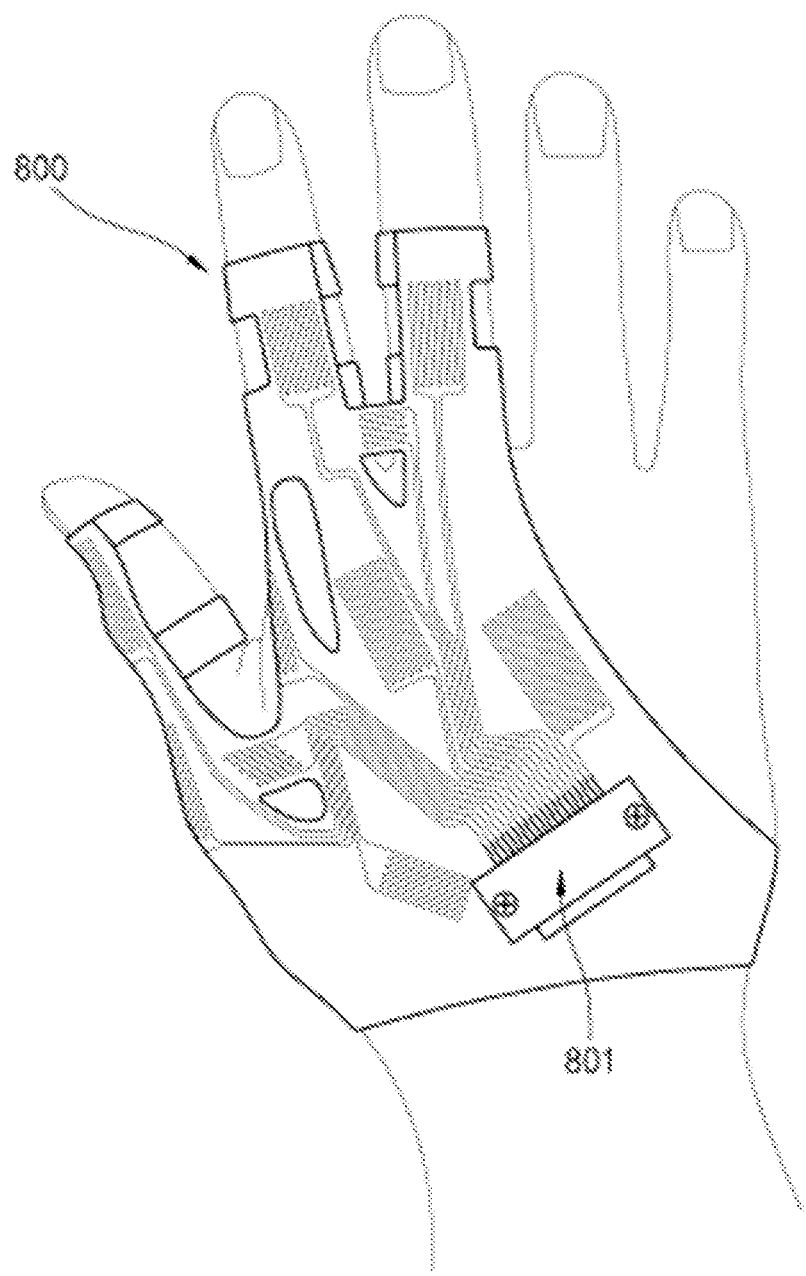
FIG. 13 is a plan view illustrating a state in which the hand-wearable device of FIG. 12 is worn on a hand.
Figure 14:
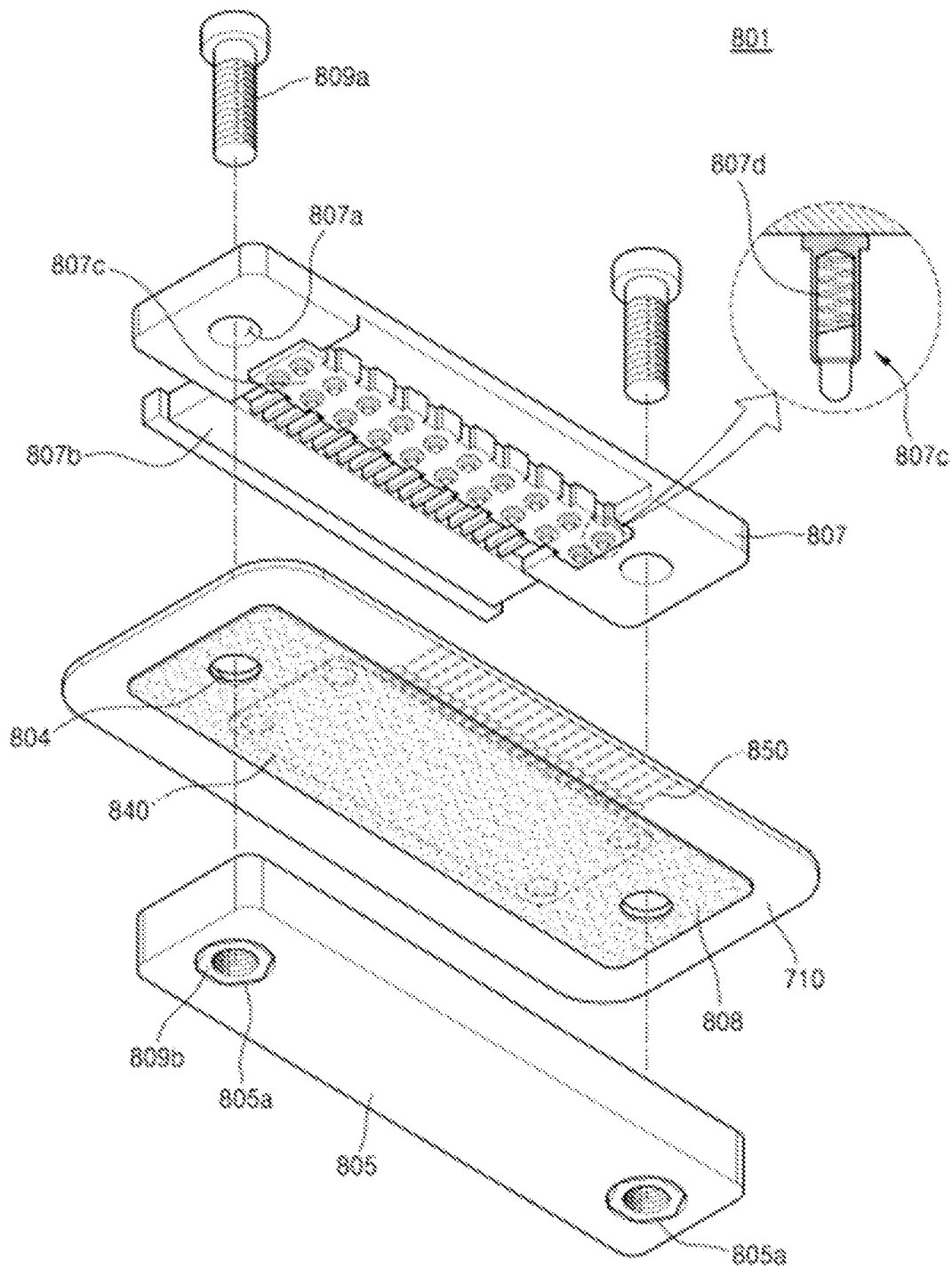
FIG. 14 is a disassembled perspective view of a connection unit of the hand-wearable device of FIG. 12.

FIG. 12 is a plan view of a hand-wearable device having a soft sensor according to a third embodiment. FIG. 13 is a plan view illustrating a state in which the hand-wearable device of FIG. 12 is worn on a hand. FIG. 14 is a disassembled perspective view of a connection unit of the hand-wearable device of FIG. 12.

Referring to FIGS. 12, 13, and 14, a hand-wearable device 800 may be a sheet of elastic material, in which a plurality of soft sensors 700 are formed to correspond to each joint of a finger. The hand-wearable device 800 of the present embodiment is generally similar to the embodiment of FIG. 6 and an electrode substrate 840 and a junction unit 850 are different in characteristics, which will be described in detail below.

The hand-wearable device 800 according to an embodiment further includes the electrode substrate 840 and the junction unit 850.

In a case of a hand-wearable device in the related art, the hand-wearable device is manufactured by cutting a portion of a surface of a soft sensor to reveal a cross-section of a channel and then directly inserting wire and a fixing method by a glue or a non-elastic film is used to prevent the inserted wire from coming off. However, in a case of the above method, there is a problem of a higher difficulty of electrode insertion as a thickness of the soft sensor decreases and a material of a sensor is softer. Furthermore, there is a problem that automation is impossible as an operator has to perform a direction connection and a long operation time is needed for multiple channels.

To solve the above problem, the hand-wearable device 800 according to an embodiment further includes the electrode substrate 840 and the junction unit 850 to easily connect the soft sensor to an external electronic device. The above description will be described in more detail below.

The electrode substrate 840 may be formed on the hand-wearable device 800 and function to connect an external electronic device (for example, a connector or the like) to the soft sensors. The electrode substrate 840 may be various circuit substrates such as a FPCB. The electrode substrate 840 may be in contact with or coupled to a flexible printed circuit (FPC) (see 910 of FIG. 16O).

The electrode substrate 840 may be formed by an insert print method. In other words, after forming a first elastic layer (see 711 of FIG. 16A), the electrode substrate 840 is inserted and formed on the first elastic layer 711. The electrode substrate 840 may be located roughly on the first elastic layer (see 711 of FIG. 16A) with being interrupted by a movement of a wrist and in an area which does not invade positions of the sensors 811, 212, 213, 221, 222, 231, 232, 260, and 270. In addition, the electrode substrate 840 may be located in an area capable of minimizing a distance between the sensors 811, 212, 213, 221, 222, 231, 232, 260, and 270 and the electrode substrate 840 to minimize a length of a wire unit 890. For example, the electrode substrate 840 may be formed on a back portion of a hand adjacent to the wrist. For durability, a periphery of the electrode substrate 840 may need to be reinforced with a hard material. Accordingly, it may be preferable to position the electrode substrate on the back portion of the hand instead of the wrist which moves flexibly. A formation position and method of the electrode substrate 840 will be described in more detail below.

The junction unit 850 may function to connect a wire unit 740 of the soft sensor 700 to the electrode substrate 840. The junction unit 850 may include a predetermined conductive material and may include a conductive material in a liquid or solid form which is capable to be coated. In an embodiment, the junction unit 850 may include a conductive liquid metal that maintains a liquid state at room temperature and has conductivity. Herein, the conductive liquid metal is described as using EGaIn as an example.

The junction unit 850 may be formed in a predetermined pattern by using a conductive liquid metal and the junction unit 850 may be formed by the EGaIn by using various methods such as 3D printing, nozzle printing, inkjet printing, roll-to-roll printing, or the like.

At least a portion of the electrode substrate 840 and the junction unit 850 connected to the electrode substrate 840 may form a connection unit 801 extending outward from the elastic sheet 710. The above description will be described in more detail below.

The connection unit 801 includes a first plate 805 and a second plate 807.

A through hole 805a is formed on the first plate 805 which is a flat plate. The through hole 805a is formed to accommodate a second coupling member 809b such as a nut inside. The elastic sheet 710 and the first plate 805 and the second plate 807 are combined by that a first coupling member 809a penetrates the second plate 807, the elastic sheet 710, and the first plate 805 to be coupled to the second coupling member 809b.

Although not illustrated in the drawing, alternatively, a screw thread is directly formed in the through hole 805a and the first coupling member 809a is possible to be directly coupled to the first plate 805. In other words, the first plate 805 and the second plate 807 may be coupled by the first coupling member 809*a* in various forms.

As described above, the first plate 805 and the second plate 807 are coupled to each other by bolting or the like, such that a contact connector 807*c* to be described below is connected to the electrode substrate 840. According to the configuration, it is possible to connect electrodes without damaging the electrode substrate 840 inserted into the soft sensor.

The second plate 807 includes a through hole 807*a*, a FPC connector 807*b*, and the contact connector 807*c*. In other words, the second plate 807 includes a flat plate shape and through holes 807*a* are formed at both side portions of the second plate 807. The first coupling member 809*a* is inserted through the through hole 807*a*.

The contact connector 807*c* is formed on a surface of the second plate 807 facing the elastic sheet 710. A portion of the contact connector 807*c* contacting the electrode substrate 840 includes a conductive material and is connected to each pin of the FPC connector 807*b*. The FPC connector 807*b* may be electrically connected to the electrode substrate 840 through the contact connector 807*c* by penetrating a first opening (see 802 of FIG. 16K formed in the second elastic layer 712.

In the hand-wearable device 800 according to an embodiment, the contact connector 807*c* is formed to have a predetermined elasticity and the contact connector 807*c* is formed to be in close contact with the electrode substrate 840.

A predetermined elastic member (see 207*d* (807*d*) of FIG. 16) such as a spring is provided inside each terminal of the contact connector 807*c* and an elastic force is applied in a direction pushing each terminal of the contact connector 807*c* to the electrode substrate 840. Accordingly, since each terminal of the contact connector 807*c* receives a force pushing toward the electrode substrate 840 in a state of being in contact with the electrode substrate 840, each terminal of the contact connector 807*c* is closely coupled to the electrode substrate 840.

The FPC connector 807*b* is formed on one side surface of the second plate. The FPC connector 807*b* includes a conductive material and is electrically connected to the contact connector 807*c*. Accordingly, an electrical signal transmitted through the soft sensor 700, the junction unit 850, the electrode substrate 840, and the contact connector 807*c* is electrically connected to an external system (such as an amplifier, measuring instrument, or the like) by connecting the FPC (see 910 of FIG. 16O) to the FPC connector 807*b*.

A reinforcement portion 808 may be further formed on an outer surface of a region in which the electrode substrate 840 is embedded in the elastic sheet 710. The reinforcement portion 808 including a non-elastic film may be further formed on at least one surface of the region in which the electrode substrate 840 is embedded, preferably, both surfaces of the region in which the electrode substrate 840 is embedded, to improve the durability of the elastic sheet 710.

A force generated when the first plate 805 and the second plate 807 are coupled may be dispersed by the reinforcement portion 808 and concentration of stress in a second opening 804 formed through the elastic sheet 710 may be prevented. Furthermore, the junction unit 850 may be prevented from being damaged by external pressure and tension around the connection unit 801 may be prevented to improve the durability of the elastic sheet 710.

The first plate 805 and the second plate 807 are coupled by coupling members 809*a* and 809*b*. The drawing illustrates that the first coupling member 809*a* is formed in a form of a bolt and the second coupling member 809*b* is formed in a form of a nut, and the first plate 805 and the second plate 807 are coupled by bolt/but coupling, but the inventive concept is not limited thereto. Various types of coupling members coupling the first plate 805 and the second plate 807 may be provided.

According to the present disclosure, an electrical signal of the soft sensor 700 transmitted through the electrode substrate 840 may be collected by inserting a commercial FPC into the FPC connector 807*b*. In addition, compared to a process of branching the electrode substrate 840 from the main body of the soft sensor 700 and reinforcing the silicone, the connection unit 801 may be formed through a relative simple assembly process, thereby reducing manufacturing costs and time. As the connector is not directly attached or detached to/from the electrode substrate 840, a plating portion of the electrode substrate 840 may be prevented from being worn or damaged. In addition, since the commercial FPC connector 807*b* detached from a FPC, a skill of using a connector is not required.

According to the present disclosure, an electrode portion may be stably formed regardless of a thickness of the channel, a channel size, a number of channel, a material of a soft sensor, or the like. In addition, the electrode portion may be formed automatically by using a printing equipment, and thus, reducing an operation time. In addition, an electrode portion having a compact structure may be formed.

Figure 15:
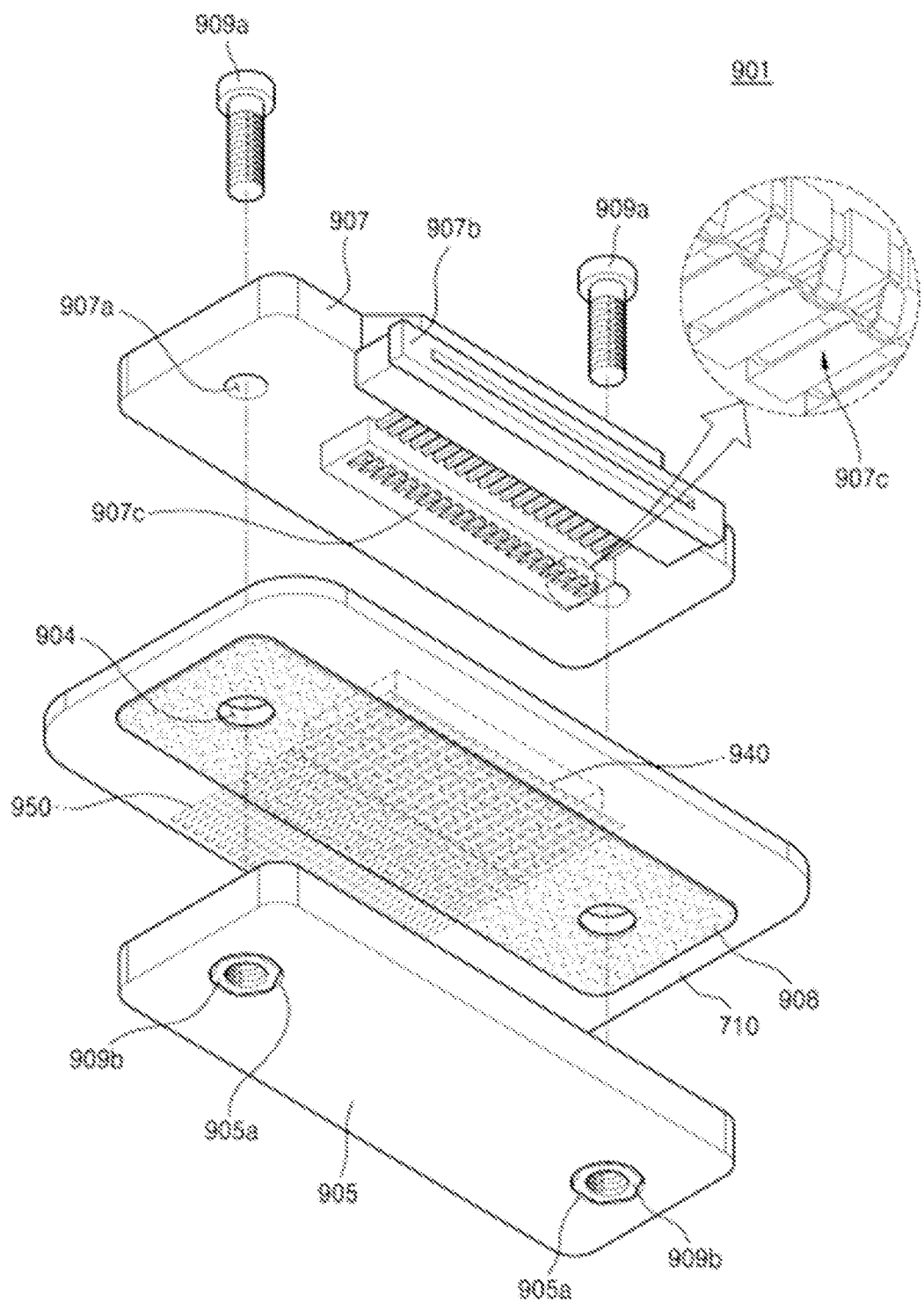
FIG. 15 is a disassembled perspective view of a connection unit of a hand-wearable device according to another embodiment.

FIG. 15 is a disassembled perspective view of a connection unit of a hand-wearable device according to another embodiment.

A connection unit 901 includes a first plate 905 and a second plate 907.

A through hole 905*a* is formed on the first plate 905 which is a flat plate. The through hole 905*a* is formed to accommodate a second coupling member 909*b* such as a nut inside. The elastic sheet 710 and the first plate 905 and the second plate 907 are combined by that a first coupling member 909*a* penetrates the second plate 907, the elastic sheet 710, and the first plate 905 to be coupled to a second coupling member 909*b*.

Although not illustrated in the drawing, alternatively, a screw thread is directly formed in the through hole 905*a* and the first coupling member 909*a* is possible to be directly coupled to the first plate 905. In other words, the first plate 905 and the second plate 907 may be coupled by the first coupling member 909*a* in various forms.

The second plate 907 includes a through hole 907*a*, a FPC connector 907*b*, and the contact connector 907*c*. In other words, the second plate 907 includes a flat plate shape and through holes 907*a* are formed at both side portions of the second plate 907. The first coupling member 909*a* is inserted through the through hole 907*a*.

The contact connector 907*c* is formed on a surface of the second plate 907 facing the elastic sheet 710. A portion of the contact connector 907*c* contacting the electrode substrate 940 includes a conductive material and is connected to each pin of the FPC connector 907*b*. The FPC connector 907*b* may be electrically connected to the electrode substrate 940 through the contact connector 907*c* by penetrating a first opening (see 802 of FIG. 16K formed in the second elastic layer 712.

The connection unit 901 of the hand-wearable device according to another embodiment is different from the embodiment of FIG. 14 described above in that the contact connector 907c is a connector having structural elasticity. In other words, the contact connector 907c of the connection unit 901 according to an embodiment is not provided with a separate elastic member, and the contact connector 907c is formed to have structural elasticity. For example, as shown in FIG. 15, the contact connector 907c is formed in a form of a plate-spring and is formed to have structural elasticity to function as the elastic member. Accordingly, since the contact connector 907c receives a force pushing toward the electrode substrate 940 in a state of being in contact with the electrode substrate 940, the contact connector 907c is closely coupled to the electrode substrate 940.

The FPC connector 907b is formed on one side surface of the second plate 907. The FPC connector 907b includes a conductive material and is electrically connected to the contact connector 907c. Accordingly, an electrical signal transmitted through the soft sensor 700, a junction unit 950, the electrode substrate 940, and the contact connector 907c is electrically connected to an external system (such as an amplifier, measuring instrument, or the like) by connecting the FPC (see 910 of FIG. 16O) to the FPC connector 807b.

A reinforcement portion 908 may be further formed on an outer surface of a region in which the electrode substrate 940 is embedded in the elastic sheet 710. The reinforcement portion 908 including a non-elastic film may be further formed on at least one surface of the region in which the electrode substrate 940 is embedded, preferably, both surfaces of the region in which the electrode substrate 940 is embedded, to improve the durability of the elastic sheet 710.

A force generated when the first plate 905 and the second plate 907 are coupled may be dispersed by the reinforcement portion 908 and concentration of stress in a second opening 904 formed through the elastic sheet 710 may be prevented. Furthermore, the junction unit 950 may be prevented from being damaged by external pressure and tension around the connection unit 901 may be prevented to improve the durability of the elastic sheet 710.

The first plate 905 and the second plate 907 are coupled by coupling members 909a and 909b. The drawing illustrates that the first coupling member 909a is formed in a form of a bolt and the second coupling member 909b is formed in a form of a nut, and the first plate 905 and the second plate 907 are coupled by bolt/but coupling, but the inventive concept is not limited thereto. Various types of coupling members coupling the first plate 905 and the second plate 907 may be provided.

According to the present disclosure, an electrical signal of the soft sensor 700 transmitted through the electrode substrate 940 may be collected by inserting a commercial FPC into the FPC connector 907b. In addition, compared to a process of branching the electrode substrate 940 from the main body of the soft sensor 700 and reinforcing the silicone, the connection unit 901 may be formed through a relative simple assembly process, thereby reducing manufacturing costs and time. As the connector is not directly attached or detached to/from the electrode substrate 940, a plating portion of the electrode substrate 940 may be prevented from being worn or damaged. In addition, since the commercial FPC connector 907b detached from a FPC, a skill of using a connector is not required.

FIG. 16 are diagrams illustrating a method of manufacturing a hand-wearable device having a soft sensor according to an embodiment.

Figure 16A:
FIGS. 16A to 16O show diagrams illustrating a method of manufacturing a hand-wearable device having a soft sensor according to an embodiment.

Referring to FIG. 16A, the first elastic material is coated on a base substrate 701. After coating the first elastic material, the first elastic material hardens when a predetermined time passes and forms a first elastic layer 711. Herein, FIG. 16aA illustrates that a cross-section of the first elastic layer 711 includes a rectangular shape as an example, but the inventive concept is not limited thereto. The first elastic layer 711 may be formed in various sizes and shapes.

A glass wafer may be used as the base substrate 701.

Since the first elastic layer 711 has a very low thickness and good elasticity, the first elastic layer 711 may be manufactured in various shapes and sizes, and may be cut and used according to a desired shape.

Figure 16B:
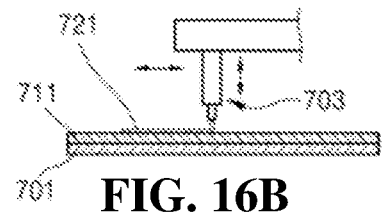

Next, referring to FIG. 16B, a conductive liquid metal is printed on the first elastic layer 711 by using a nozzle 703.

Figure 16C:
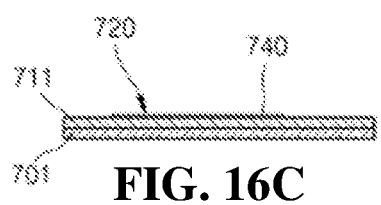

The conductive liquid metal is printed on the first elastic layer 711 by using the nozzle 703 to form a sensor unit 720 and a wire unit 740, as shown in FIG. 16C.

Figure 16D:
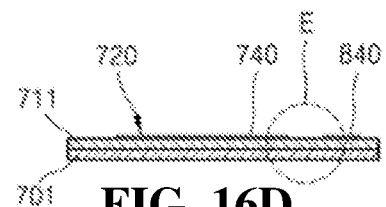

Next, referring to FIG. 16D, an electrode substrate 840 is arranged on one side of the wire unit 740. At least a portion of the electrode substrate 840 may be arranged on the first elastic layer 711 and a position of the electrode substrate 840 may be fixed by a glue or an adhesive tape.

Figure 16E:
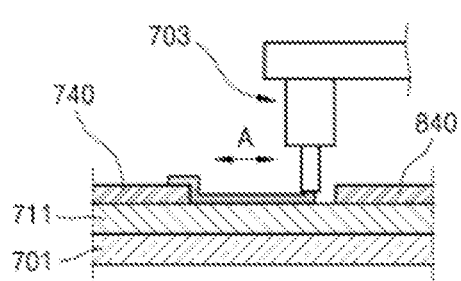

Then, referring to FIG. 16E, a junction unit 850 connecting the wire unit 740 and the electrode substrate 840 is printed. The junction unit 850 may be provided inside or on one side of the elastic sheet 710 and function to connect the wire unit 740 to the electrode substrate 840.

In a method of manufacturing the hand-wearable device according to an embodiment, a property of the conductive liquid metal such as EGaln, which has high structural stability, is used to build a three-dimensional column and the column is dropped onto the electrode substrate 840 to form the junction unit 850. In detail, when the conductive liquid metal such as EGaln is printed, a very thin oxide film is formed on the surface of the conductive liquid metal. In other words, the interior of the conductive liquid metal is liquid but a thin film is formed outside, such that a shape of the interior liquid may be deformed to a certain extent. Accordingly, a process of lifting the conductive liquid metal high may be possible due to the oxide film. When cutting the conductive liquid metal, the cutting is performed as bursting the thin film. When the conductive liquid metal is cut, the oxide film is burst, and the liquid inside the conductive liquid metal is exposed, the oxide film is formed immediately again. The above description will be described in more detail below.

FIG. 16E is an enlarged of a portion E of FIG. 16D. First, referring to FIG. 16E, the nozzle 703 moves from one end of the wire unit 740 in a first direction (direction A) to a certain extent to print the conductive liquid metal. Accordingly, a portion of junction unit 850 is formed and an end of the wire unit 740 is covered.

Figure 16F:
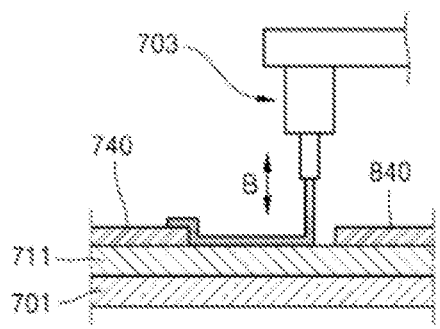

As described above, in a state where the nozzle 703 is printing and moving near the electrode substrate 840, the nozzle 703 moves in a second direction (direction B), that is, in the drawing, the nozzle 703 moves vertically, and the conductive liquid metal is made erect in the vertical direction, as shown in FIG. 16F. In detail, the conductive liquid metal such as EGaln has high viscosity and structural stability, therefore, the conductive liquid metal may be made erect in the vertical direction up to a certain height. By using the property of the conductive liquid metal, the nozzle 703 is continuously moved in the vertical direction while the conductive liquid metal is continuously sprayed. Therefore, the junction unit 850 including the conductive liquid metal is made erect in the vertical direction. The junction unit 850 may be made erect vertically to a height sufficient to cover one end of the electrode substrate 840 when the junction unit 850 falls down.

Figure 16G:
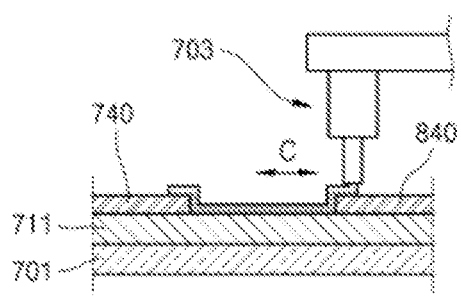
Figure 16H:
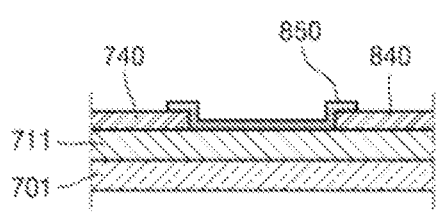

Although the drawing illustrates that the second direction (direction B) is a vertical direction, the inventive concept is not limited thereto. In other words, the conductive liquid metal does not have to be made erect in the vertical direction while the nozzle 703 moves vertically as shown in the drawing, and the conductive liquid metal may be made erect in an oblique direction while the nozzle 703 move obliquely to a certain extent. That is, the second direction (direction B) may be referred to as any direction that is not parallel to the direction A and forms a predetermined angle with the direction A. The junction unit 850 is made erect to a sufficient height, the nozzle 703 is moved to a direction C and an end portion of the junction unit 850 connected to the nozzle 703 is seated on an upper portion of the electrode substrate 840, as shown in FIG. 16G. In other words, the junction unit 850 is formed at a height high enough to cover the one end of the electrode substrate 840 and when the junction unit 850 completely falls off, the junction unit 850 covers the one end of the electrode substrate 840. Next, when the end portion of the junction unit 850 connected to the nozzle 703 is cut by using a vacuum pressure, as a result, the junction unit 850 is formed as one end covering the end of the wire unit 740 and the other end covering the end of electrode substrate 840 and functions to electrically connect the wire unit 740 to the electrode substrate 840, as shown in FIG. 16H.

Figure 16I:
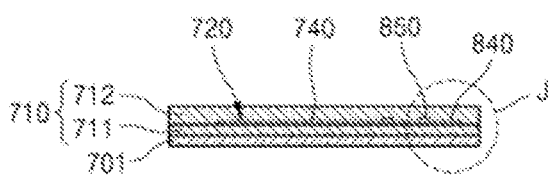

Next, referring to FIG. 16I, the second elastic material is coated on the first elastic layer 711 on which the sensor unit 720, the wire unit 740, the junction unit 850, or the like, are formed to form the second elastic layer 712. In this state, the hand-wearable device may be removed from the base substrate 701.

Figure 16J:
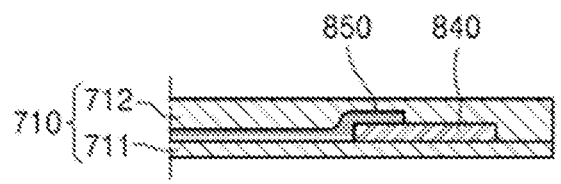
Figure 16K:
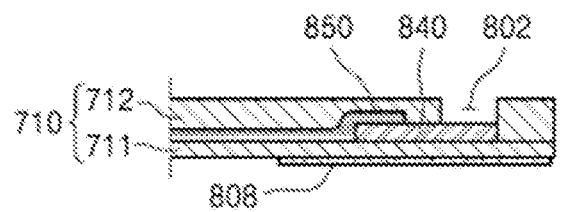
Figure 16L:
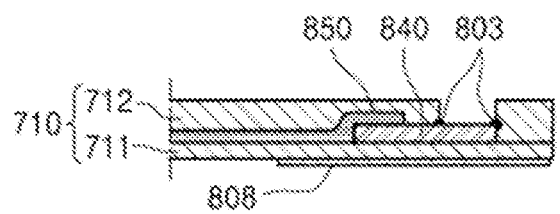

FIG. 16J is an enlarged of a portion J of FIG. 16. In a state where the electrode substrate 840 and the junction unit 850 are embedded in the second elastic layer 712 as shown in FIG. 16J, a first opening 802 is formed in the second elastic layer 712 and a portion of the electrode substrate 840 is exposed to the outside, as shown in FIG. 16K. The first opening 802 may be formed in a shape corresponding to the contact connector (see 807*c* of FIG. 16O) of the second plate (see 807 of FIG. 16O) to be described below.

The reinforcement portion 808 may be further formed on a bottom surface of the elastic sheet 710, in more detail, on a bottom surface of a region in which the electrode substrate 840 is embedded in the elastic sheet 710. Although not shown in the drawing, the reinforcement portion may also be formed on an upper surface of the region in which the electrode substrate 840 is embedded in the elastic sheet 710. The reinforcement portion 808 including non-elastic film may be further formed on both surfaces of the region in which the electrode substrate 840 is embedded to dispersing pressure by external force and improving the durability of the elastic sheet 710.

A force generated when the first plate 805 and the second plate 807 are coupled may be dispersed by the reinforcement portion 808 and concentration of stress in a second opening 804 formed through the elastic sheet 710 may be prevented. Furthermore, the junction unit 850 may be prevented from being damaged by external pressure and tension around the connection unit 801 may be prevented to improve the durability of the elastic sheet 710.

Next, as shown in FIG. 16I, a glue or the like may be used in at least a portion of a boundary portion of the electrode substrate 840 and the elastic sheet 710, in particular, a boundary portion of the electrode substrate 840 adjacent to the junction unit 850 to form a sealing portion 803. In other words, the sealing portion 803 may be further formed at a boundary portion between a region exposed the electrode substrate 840 to the outside and the elastic sheet 710 to prevent an leakage of the junction unit 850.

Figure 16M:
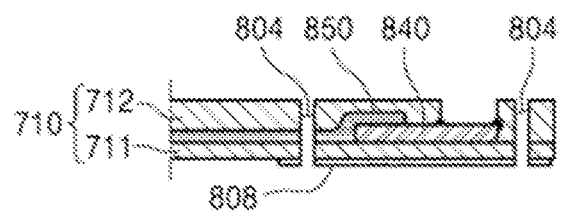

Next, referring to FIG. 16M, a second opening 804 is formed through the elastic sheet 710. In other words, the second opening 804 is formed by entirely penetrating the first elastic layer 711, the junction unit 850, and the second elastic layer 712.

Figure 16N:
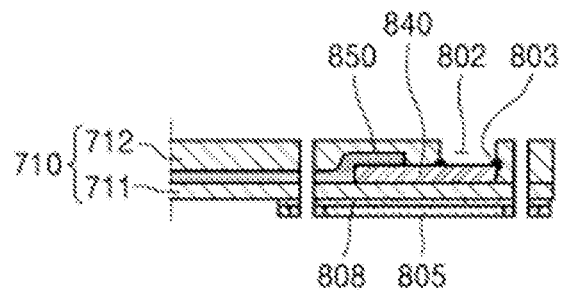

Then, referring to FIG. 16N, the first plate 805 is arranged on the bottom surface of the elastic sheet 710. A through hole is formed on the first plate 805 which is a flat plate. Herein, the second opening 804 formed through the elastic sheet 710 and the through hole of the first plate 805 may be formed at positions corresponding to each other.

Figure 16O:
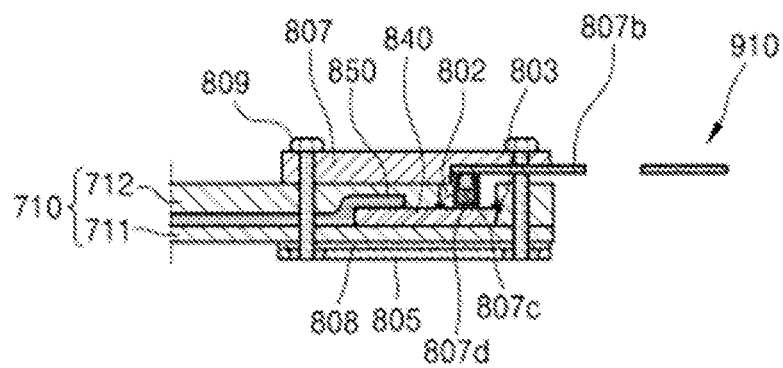

Next, referring to FIG. 16O, after arranging the second plate 807 on the upper surface of the elastic sheet 710, a coupling member 809 is used to combine the first plate 805 and the second plate 807 to complete the connection unit 801.

Herein, the second plate 807 includes a through hole (see 807*a* of FIG. 14), the FPC connector 807*b*, and the contact connector 807*c*. In other words, the second plate 807 includes a flat plate shape and through holes (see 807*a* of FIG. 14) are formed at both side portions of the second plate 807. The contact connector 807*c* is formed on a surface of the second plate 807 facing the elastic sheet 710. A portion of the contact connector 807*c* contacting the electrode substrate 840 includes a conductive material and is connected to each pin of the FPC connector 807*b*. The FPC connector 807*b* may be electrically connected to the electrode substrate 840 through the contact connector 807*c* by penetrating a first opening 802 formed in the second elastic layer 712.

In the hand-wearable device 800 according to an embodiment, the contact connector 807 is formed to have a predetermined elasticity and the contact connector 807*c* is formed to be in close contact with the electrode substrate 840. A predetermined elastic member 807*d* such as a spring is provided inside each terminal of the contact connector 807*c* and an elastic force is applied in a direction pushing each terminal of the contact connector 807*c* to the electrode substrate 840. Accordingly, since each terminal of the contact connector 807*c* receives a force pushing toward the electrode substrate 840 in a state of being in contact with the electrode substrate 840, each terminal of the contact connector 807*c* is closely coupled to the electrode substrate 840.

The FPC connector 807*b* is formed on one side surface of the second plate. The FPC connector 807*b* includes a conductive material and is electrically connected to the contact connector 807*c*. Accordingly, an electrical signal transmitted through the soft sensor 700, the junction unit 850, the electrode substrate 840, and the contact connector 807*c* is electrically connected to an external system (such as an amplifier, measuring instrument, or the like) by connecting the FPC 910 to the FPC connector 807*b*.

The first plate 805 and the second plate 807 may be coupled by a coupling member (not shown) such as a bolt. That is, the coupling member (not shown) is formed in a form of a bolt and a screw thread (not shown) is formed inside a combining portion 805*a* of the first plate 805. The first plate 805 and the second plate 807 may be combined by the coupling member (not shown) and the combining portion 805*a*. In addition, the first plate 805 and the second plate 807 may be combined in various forms.

When the first plate 805 and the second plate 807 are coupled through the second opening 804 of the elastic sheet 710, the second plate 807 connected to the electrode substrate 840/junction unit 850 and the first plate 805 combined to the second plate 807 form the connection unit 801 protruding from the main body of the elastic sheet 710. In other words, it may also expressed as that the connection unit 801 electrically connected to the electrode substrate 840 and the junction unit 850 are formed by branching from the main body of the elastic sheet 710.

According to the present disclosure, an electrical signal of the soft sensor 700 transmitted through the electrode substrate 840 may be collected by inserting a commercial FPC into the FPC connector 807b. In addition, compared to a process of branching the electrode substrate 840 from the main body of the soft sensor 700 and reinforcing the silicone, the connection unit 801 may be formed through a relative simple assembly process, thereby reducing manufacturing costs and time. As the connector is not directly attached or detached to/from the electrode substrate 840, a plating portion of the electrode substrate 840 may be prevented from being worn or damaged. In addition, since the commercial FPC connector 807b detached from a FPC, a skill of using a connector is not required.

According to the present disclosure, an electrode portion may be stably formed regardless of a thickness of the channel, a channel size, a number of channel, a material of a soft sensor, or the like. In addition, the electrode portion may be formed automatically by using a printing equipment, and thus, reducing an operation time. In addition, an electrode portion having a compact structure may be formed.

When the connection unit 801 exposing an end portion 840a of the electrode substrate 840 is formed, the end portion 840a of the electrode substrate 840 may be electrically connected to the external FPC 910. Although the drawing illustrates that the FPC 910 is formed on one side of the electrode substrate 840, the inventive concept is not limited thereto. In addition to the FPC, various electronic devices or electronic components may be arranged to be electrically connected to the FPC connector 807b.

As a result, although not illustrated in the drawing, a soft sensor sheet may be cut into a shape desired by the user such as a shape of a hand or glove by using methods such as laser cutting, cutting machine, knife mold, or the like to complete the soft sensor and a hand-wearable device having the soft sensor.

In the soft sensor manufactured in the above method, since the sensor unit 720 and the wire unit 740 maintain a liquid state between the first elastic layer 711 and the second elastic layer 712, the elasticity of the sensor unit 720 and the wire unit 740 may be maintained.

In addition, the soft sensor may be made with a thickness less than that of using a mold, and the channel pattern may be easily designed and changed by using the CAD/CAM.

Fourth Embodiment

Figure 17:
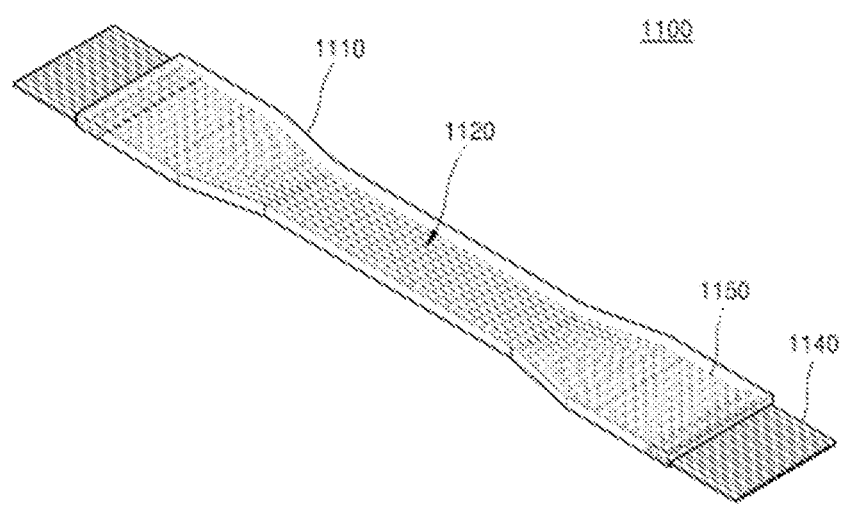
FIG. 17 is a perspective view of a printed cable according to an embodiment.

FIG. 17 is a perspective view of a printed cable according to an embodiment.

Referring to FIG. 17, a printed cable 1100 according to an embodiment may include an elastic sheet 1110, a wire unit 1120, an electrode substrate 1140, and a junction unit 1150.

Since a flexible printed cable (FPC) of the related art is used as a thin wire with integrated inside the electronics has flexible features, the FPC may be bent in a certain level. As the FPC is not stretchable, cracks are generated in the plating portion when a certain tension is applied, and thus the function of an electrode may be lost. In addition, in a case where the FPC is bent beyond a certain extent (that is, bent with very little curvature), cracks may be generated in the plating portion and the plating portion may be broken, and fatigue fractures may be generated due to repeated bending loads. Due to the curvature limitation, a limitation in an internal design of electronic products using the FPC may exist.

To solve the problem, the development of stretchable wires was required. However, a conductive portion of a wire of the related art includes a non-stretchable metal material. Accordingly, in most cases, non-stretchable wires in a twisted form have been used to manufacture stretchable wires. However, in this case, there was a problem that the tensile rate is low, the manufacture is difficult, and there is a limit of miniaturization.

To solve the problem, the present disclosure uses a soft and flexible silicone material and a conductive liquid metal to provide flexible as well as stretchable printed cable.

In the printed cable according to an embodiment, fatigue failure does not occur in the elastic sheet 1110 including the silicone material or the like since there is no fatigue load with respect to repeated bending. In addition, since an electrode inside the cable is a liquid metal, cracks does not occur due to bending. Furthermore, an electrical connection is not broken even in a stretched state.

The description will be described in more detail below.

Figure 18A:
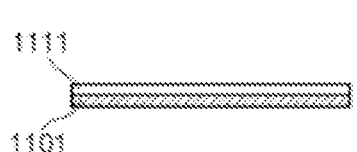
FIGS. 18A to 18I are diagrams illustrating a method of manufacturing the printed cable of FIG. 17.
Figure 18B:
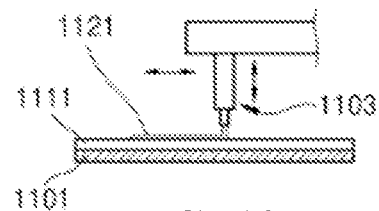
Figure 18C:
Figure 18D:
Figure 18E:
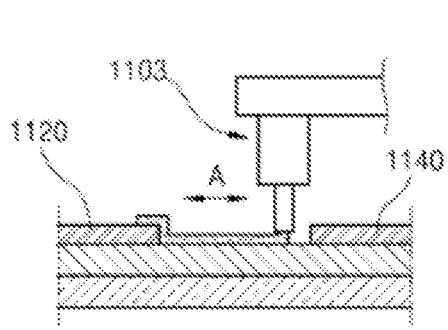
Figure 18F:
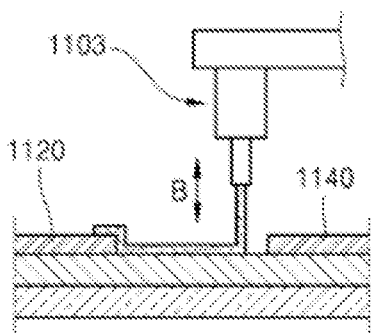
Figure 18G:
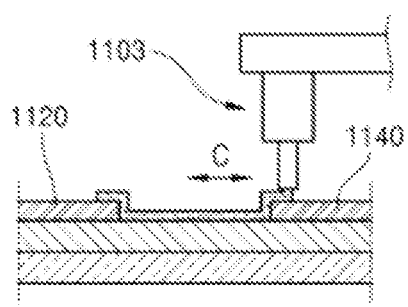
Figure 18H:
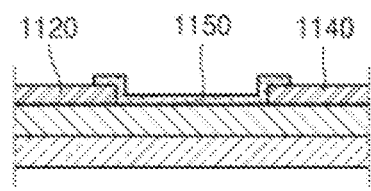
Figure 18I:
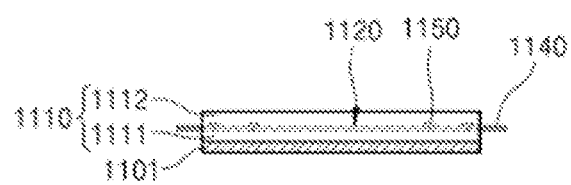

In detail, the elastic sheet 1110 includes a first elastic layer (see 1111 of FIG. 18I) and a second elastic layer (see 1120 of FIG. 18I). The first elastic layer (see 1111 of FIG. 18I) and the second elastic layer (see 1120 of FIG. 18I) may be formed separately and may be stacked in a vertical direction. Herein, although the elastic sheet 1110 is shown as including two layers of the first elastic layer (see 1111 of FIG. 18I) and the second elastic layer (see 1120 of FIG. 18I), the inventive concept is not limited thereto. The elastic sheet 1110 may include two or more layers of various materials when needed.

The first elastic layer 1111 is a layer formed by coating with a first elastic material. The first elastic material may be a non-conductive material having elasticity and flexibility. Herein, although the first elastic material is described as using, for example, silicone, the inventive concept is not limited thereto. As described above, the first elastic layer 1111 may be formed by coating the first elastic material on a base substrate (see 1101 in FIG. 18A) by various methods such as spin coating, silicone coating (squeegeeing), compression molding, printing, or the like.

The second elastic layer 1112 is a layer formed by coating with a second elastic material. The second elastic material may be a non-conductive material having elasticity and flexibility. The second elastic material may use a material having a surface tension less than that of a conductive liquid metal (see 1121 of FIG. 18B) forming a wire unit 1120. In an embodiment, for example, as the second elastic material uses silicone, the first elastic material and the second elastic material are described as the same material, but the inventive concept is not limited thereto. Herein, when the first elastic material and the second elastic material use the same silicone, the silicone may be formed as a monolithic sheet. However, the inventive concept is not limited thereto. The second elastic material may use any material as a material has a surface tension less than a conductive liquid metal 1121 and has elasticity and flexibility. As described above, the second elastic layer 1112 may be formed by coating the second elastic material on the first elastic layer 1111 (and the wire unit 1120 on the first elastic layer 1111) by various methods such as spin coating, silicone coating (squeegeeing), compression molding, printing, or the like.

Herein, a thickness of the elastic sheet 1110 may be formed to about 300 μm to 500 μm, and may be formed to a suitable thickness for use as an electric wire.

The wire unit 1120 may be formed between the first elastic layer 1111 and the second elastic layer 1112. Herein, the wire unit 1120 may be formed on the first elastic layer 1111 in a predetermined pattern by using the conductive liquid metal (see 1121 of FIG. 18B). As described above, the wire unit 1120 may be formed by using various methods such as 3D printing, nozzle printing, inkjet printing, roll-to-roll printing, or the like.

The wire unit 1120 may include a predetermined conductive material and may include a conductive material in a liquid or solid form which is capable to be coated. In an embodiment, the wire unit 1120 may include a conductive liquid metal that maintains a liquid state at room temperature and has conductivity. Herein, the conductive liquid metal is described as using EGaIn as an example.

The EGaIn is also referred to as an eutectic gallium-indium composite. The EGaIn may include 75.5 wt % of gallium (Ga) and 24.5 wt % of indium (In). The EGaIn may be dissolved at about 15.7° C. and maintain a liquid state at room temperature. In addition, the EGaIn has a conductivity level of $3.4 \times 10^4$ S/cm, which is very high conductivity. In addition, the EGaIn is low in viscosity and flows well, and has a high surface tension due to an oxide film on the surface thereof. Since the EGaIn has a high surface tension, it is easy to form micro-channels as the EGaIn maintains a shape during 3D printing in a desired pattern. In addition, it is possible for the EGaIn to be printed directly in a desired pattern by injection through a syringe coupled to a CNC facility without any chemical treatment.

As described above, as the wire unit 1120 includes the conductive liquid metal, the sensor unit 120 may have sufficient elasticity. Herein, a length and interval of the wire unit 1120 may be variously formed according to the performance and size required for the printed cable 1100.

Herein, the printed cable 1100 according to an embodiment may design a channel pattern by using the CAD, which makes it easy to design a plurality of channel patterns at one time.

In addition, since the printed cable 1100 according to the present disclosure is not limited in size and has a very low thickness and elasticity, various numbers and shapes of the wire unit 1120 may be formed.

An electrode substrate 1140 may be formed at at least one end of the wire unit 1120 to function to connect an external electronic device (for example, a connection, or the like) and the printed cable 1100. The electrode substrate 1140 may be various circuit substrates such as a FPCB. The electrode substrate 1140 may be in contact with or coupled to an external connector (not shown).

A junction unit 1150 may function to connect the wire unit 1120 to the electrode substrate 1140 of the printed cable 1100. The junction unit 1150 may include a predetermined conductive material and may include a conductive material in a liquid or solid form which is capable to be coated. In an embodiment, the junction unit 1150 may include a conductive liquid metal that maintains a liquid state at room temperature and has conductivity. Herein, the conductive liquid metal is described by using EGaIn as an example.

The junction unit 1150 may be formed in a predetermined pattern by using a conductive liquid metal and the junction unit 1150 may be formed by the EGaIn by using various methods such as 3D printing, nozzle printing, inkjet printing, roll-to-roll printing, or the like.

Here, the junction unit 1150 may be formed to a suitable length such that a section with a sudden turn is not formed. In addition, the interval of the junction unit 1150 may be determined according to a pitch of the electrode substrate to be used.

Here, the junction unit 1150 may be formed to a suitable length such that a sudden turning section does not occur. In addition, the electrode interval of the junction unit 1150 may be determined according to a pitch of the electrode substrate to be used. Herein, when a junction unit is formed by using a conductive paste, a heating process for hardening the conductive paste at a high temperature is needed, and the hardened paste may have a high brittleness and easily break. In addition, a printing material replacement process is needed, which increases the complexity of the manufacturing process. Accordingly, the present technology simplifies the manufacturing process and increases the durability of a printed cable by printing a wire unit and a junction unit with one material.

FIGS. 18A to 18I are diagrams illustrating a method of manufacturing the printed cable of FIG. 17.

Referring to FIG. 18A, the first elastic material is coated on a base substrate 1101. After coating the first elastic material, the first elastic material hardens when a predetermined time passes and forms the first elastic layer 1111. Herein, FIG. 18A illustrates that a cross-section of the first elastic layer 1111 includes a rectangular shape as an example, but the inventive concept is not limited thereto. The first elastic layer 1111 may be formed in various sizes and shapes.

A glass wafer may be used as the base substrate 1101.

Since the first elastic layer 1111 has a very low thickness and good elasticity, the first elastic layer 1111 may be manufactured in various shapes and sizes, and may be cut and used according to a desired shape Next, referring to FIG. 18B, a conductive liquid metal is printed on the first elastic layer 1111 by using a nozzle 1103.

The EGaIn, which is the conductive liquid metal, may be accommodated in the nozzle 1103. The nozzle 1103 may be coupled to a computerized numerical control (CNC) equipment and may be controlled to be movable in directions of three axes. The CNC equipment may be a 3D printer and may include a three-axis controller, an injecting controller, a microscope, or the like.

The conductive liquid metal is printed on the first elastic layer 1111 by using the nozzle 1103 to form the wire unit 1120 as shown in FIG. 18C.

Next, referring to FIG. 18D, the electrode substrate 1140 is arranged on at least one side of the wire unit 1120. At least a portion of the electrode substrate 1140 may be arranged on the first elastic layer 1111 and a position of the electrode substrate 1140 may be fixed by a glue or an adhesive tape.

Then, referring to FIG. 18E, a junction unit 1150 connecting the wire unit 1120 and the electrode substrate 1140 is printed. The junction unit 1150 may be provided inside or on one side of the elastic sheet 1110 and function to connect the wire unit 1120 to the electrode substrate 1140.

In a method of manufacturing the hand-wearable device according to an embodiment, a property of the conductive liquid metal such as EGaIn, which has high structural stability, is used to build a three-dimensional column and the column is dropped onto the electrode substrate 1140 to form the junction unit 1150. In detail, when a conductive liquid metal such as EGaIn is printed, a very thin oxide film is formed on its surface. In other words, the interior of the conductive liquid metal is liquid but a thin film is formed on the outside, such that a shape of the interior liquid may be deformed to a certain extent. Accordingly, a process of lifting the conductive liquid metal high may be possible due to the oxide film. When cutting the conductive liquid metal, the thin film is burst open when the cutting is performed. When the conductive liquid metal is cut, the oxide film is burst open and the liquid inside the conductive liquid metal is exposed, but the oxide film immediately forms again. The above description will be described in more detail below.

First, referring to FIG. 18E, the nozzle 1103 moves from one end of the wire unit 1120 in the first direction (direction A) to a certain extent to print the conductive liquid metal. Accordingly, a portion of junction unit 1150 is formed and an end of the wire unit 1120 is covered.

As described above, in a state where the nozzle 1103 is printing and moving near the electrode substrate 1140, the nozzle 1103 moves in the second direction (direction B), that is, in the drawing, the nozzle 1103 moves vertically, and the conductive liquid metal is made erect in the vertical direction, as shown in FIG. 18F. In detail, since the EGaIn has high structural stability according to an oxide formed, the EgaIn may be made erect vertically up to a certain height. By using the property of the conductive liquid metal, the nozzle 1103 is continuously moved in the vertical direction while the conductive liquid metal is continuously sprayed. Therefore, the junction unit 1150 including the conductive liquid metal is made erect in the vertical direction. The junction unit 1150 may be made erect vertically to a height sufficient to cover one end of the electrode substrate 1140 when the junction unit 1150 falls down.

The junction unit 1150 is made erect to a sufficient height, the nozzle 1103 is moved to the direction C and an end portion of the junction unit 1150 connected to the nozzle 1103 is seated on an upper portion of the electrode substrate 1140, as shown in FIG. 18G. In other words, the junction unit 1150 is formed at a height high enough to cover the one end of the electrode substrate 1140 and when the junction unit 1150 completely falls off, the junction unit 1150 covers the one end of the electrode substrate 1140. Next, when the end portion of the junction unit 1150 connected to the nozzle 1103 is cut by using a vacuum pressure, as a result, the junction unit 1150 is formed as one end covering the end of the wire unit 1120 and the other end covering the end of electrode substrate 1140 and functions to electrically connect the wire unit 1120 to the electrode substrate 1140, as shown in FIG. 5H.

Next, referring to FIG. 18I, the second elastic material is coated on the first elastic layer 1111 on which the wire unit 1120, the junction unit 1150, or the like, are formed to form the second elastic layer 1112. When the second elastic layer 1112 is hardened, the second elastic layer 1112 is cut into a desired shape by using various methods such as laser cutting, cutting machine, knife mold, or the like. As a result, the second elastic layer 1112 may be removed from the base substrate 1101 to complete the printed cable 1100.

In the soft sensor manufactured in the above method, since the wire unit 1120 maintains a liquid state between the first elastic layer 1111 and the second elastic layer 1112, the elasticity of the wire unit 1120 may be maintained.

In addition, a thickness of the cable may be made thin and a channel pattern may be easily designed and changed by using the CAD/CAM.

According to the method, a process of connecting the wire unit 1120 to the electrode substrate 1140 may be automated by using a print equipment, and thus, an operation time may be reduced. Furthermore, the present disclosure simplifies the manufacturing process and increases the durability of a printed cable by printing a wire unit and a junction unit with one material.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

Embodiments according to the present disclosure described above may be implemented in a form of a computer program that may be executed through various components on a computer, and the computer program may be recorded on a computer-readable medium. The medium may be to continue storing the computer-executable program, or to store for execution or download. In addition, the medium may be carious recording units or storage units in a form of a single or several hardware combined, which is not limited to a medium directly connected to any computer system, but may be distributed on a network. Examples of the medium include magnetic storage media such as hard disks, floppy disks, and magnetic tapes, optical recording media such as CD-ROMs and DVDs, magneto-optical medium such as floptical disk, a medium including a program configured to store program instructions, including a ROM, a RAM, a flash memory, or the like. As another example of the medium, recording media or storage media managed by an app store that distributes applications, a site that supplies or distributes various software, a server, or the like may be used.

While the inventive concept has been particularly shown and described with reference to exemplary embodiments thereof, it will be understood by those of ordinary skill in the art that various changes in form and details may be made therein without departing from the spirit and scope as defined by the following claims.

Therefore, the scope of the inventive concept is defined not by the detailed description of the inventive concept but by the appended claims, and all differences within the scope will be construed as being included in the inventive concept.

INDUSTRIAL APPLICABILITY

The present disclosure provides a hand-wearable device and a method of manufacturing the same.

What is claimed is:

1. A hand-wearable device comprising:
an elastic sheet comprising a first elastic layer and a second elastic layer;
at least one sensor unit formed by printing a conductive liquid metal between the first elastic layer and the second elastic layer;
a wire unit extending from the at least one sensor unit and electrically connected to the at least one sensor unit;
an electrode substrate formed on one side of the wire unit and apart from the wire unit with a predetermined distance;
a junction unit formed between the wire unit and the electrode substrate to electrically connect the wire unit and the electrode substrate; and
an extending portion extending from one surface of the elastic sheet,
wherein at least a portion of the junction unit and the electrode substrate are formed in the extending portion, and
wherein the junction unit is formed by printing a conductive liquid metal between the wire unit and the electrode substrate.

2. The hand-wearable device of claim 1, wherein the extending portion including the electrode substrate and the junction unit is formed by branching from the elastic sheet.

3. The hand-wearable device of claim 1, wherein a protective unit surrounding a remaining portion of the extending portion except for a region of the electrode substrate which is exposed to the outside, is further formed.

4. The hand-wearable device of claim 1, wherein a reinforcement unit supporting the extending portion is further formed on at least one side of the extending portion.

5. The hand-wearable device of claim 1, wherein the junction unit covers each of one end of the wire unit and one end of the electrode substrate.

6. A hand-wearable device comprising:
an elastic sheet comprising a first elastic layer and a second elastic layer;
at least one sensor unit formed by printing a conductive liquid metal between the first elastic layer and the second elastic layer;
a wire unit extending from the at least one sensor unit and electrically connected to the at least one sensor unit;
an electrode substrate formed on one side of the wire unit and apart from the wire unit with a predetermined distance;
a junction unit formed between the wire unit and the electrode substrate to electrically connect the wire unit and the electrode substrate; and
an extending portion extending from one surface of the elastic sheet,
wherein at least a portion of the junction unit and the electrode substrate are formed in the extending portion,
wherein the extending portion is formed such that an edge of an area, in which the junction unit and the electrode substrate are formed in the elastic sheet, is cut, and
wherein the device further comprises a filling unit formed by lifting up the cut portion and coating an elastic material on the cut portion.

7. A hand-wearable device comprising:
an elastic sheet comprising a first elastic layer and a second elastic layer;
at least one sensor unit formed by printing a conductive liquid metal between the first elastic layer and the second elastic layer;
a wire unit extending from the at least one sensor unit and electrically connected to the at least one sensor unit;
an electrode substrate formed on one side of the wire unit and apart from the wire unit with a predetermined distance;
a junction unit formed between the wire unit and the electrode substrate to electrically connect the wire unit and the electrode substrate; and
an extending portion extending from one surface of the elastic sheet,
wherein at least a portion of the junction unit and the electrode substrate are formed in the extending portion,
wherein an end of the electrode substrate is formed to be exposed to the outside of the elastic sheet such that the electrode substrate is electrically connected to an external connector, and
wherein a sealing unit preventing leakage of the junction unit is further formed at a boundary portion between the elastic sheet and a region of the electrode substrate which is exposed to the outside.

8. A method of manufacturing a hand-wearable device, the method comprising:
forming a first elastic layer on a base substrate;
forming a sensor unit and a wire unit by printing a conductive liquid metal on the first elastic layer in a preset pattern;
arranging an electrode substrate on one side of the wire unit to be spaced apart from the wire unit by a certain degree;
forming a junction unit connecting the electrode substrate to the wire unit by printing a conductive liquid metal on the first elastic layer;
forming an elastic sheet by forming a second elastic layer on the first elastic layer;
forming an extending portion extending from one surface of the second elastic layer and including at least a portion of the junction unit and the electrode substrate,
wherein the forming of the extending portion comprises forming a cut portion by cutting a portion of the second elastic layer along an edge of a portion where the electrode substrate and the junction unit are formed; and
forming a filling unit by lifting up the cut portion and coating an elastic material on the cut portion.

9. The method of claim 8, further comprising, after forming the filling unit:
separating the elastic sheet formed on one end of the electrode substrate and exposing the end of the electrode substrate to the outside;
forming a sealing unit preventing leakage of the junction unit at the boundary portion between a region of the electrode substrate which is exposed to the outside, and the elastic sheet;

forming a reinforcement unit supporting the extending portion on at least one side of the extending portion; and forming a protective unit surrounding a remaining portion of the extending portion except for a region of the electrode substrate which is exposed to the outside.

10. The method of claim 9, further comprising, after forming the protective unit, coupling the extending portion to a main body of the elastic sheet.

11. The method of claim 8, wherein the extending portion including the electrode substrate and the junction unit is formed by branching from the elastic sheet.

12. The method of claim 8, wherein the forming of the junction unit comprises:

printing the conductive liquid metal from one end of the wire unit while a nozzle is moved in a first direction to a certain extent;

making the conductive liquid metal erect in a second direction while the nozzle is moved in the second direction to a certain extent;

moving the nozzle toward the electrode substrate such that the conductive liquid metal electrically contacts one end of the electrode substrate while the conductive liquid metal connected to the nozzle is seated on the electrode substrate; and separating the conductive liquid metal from the nozzle.

13. The method of claim 12, wherein the conductive liquid metal, which has been made erect in the second direction, falls down toward the electrode substrate to which the nozzle moves and the conductive liquid metal is in electrical contact with one end of the electrode substrate.

14. The method of claim 12, wherein the making erect of the conductive liquid metal in the second direction while the nozzle is moved in the second direction to a certain extent comprises making the conductive liquid metal erect vertically to a height sufficient to cover one end of the electrode substrate when the conductive liquid metal falls down.

15. The method of claim 8, wherein the junction unit covers each of one end of the wire unit and one end of the electrode substrate.

16. The method of claim 8, wherein the forming of the junction unit comprises printing performed by a nozzle which is movable in directions of three axes.

* * * * *